US008427274B2

(12) United States Patent
Jones et al.

(10) Patent No.: US 8,427,274 B2
(45) Date of Patent: Apr. 23, 2013

(54) LIGHTING SYSTEM AND CONTROL METHOD THEREOF

(75) Inventors: Scott A. Jones, Carmel, IN (US); Zhen Huang, Carmel, IN (US); Paul W. Bonham, Loudon, NH (US); Chuan Li, Fremont, CA (US); Cameron D. Jiles, Indianapolis, IN (US)

(73) Assignee: SAJE Holdings, Inc., Carmel, IN (US)

( * ) Notice: Subject to any disclaimer, the term of this patent is extended or adjusted under 35 U.S.C. 154(b) by 718 days.

(21) Appl. No.: 12/344,054

(22) Filed: Dec. 24, 2008

(65) Prior Publication Data

US 2009/0167483 A1 Jul. 2, 2009

Related U.S. Application Data

(60) Provisional application No. 61/009,208, filed on Dec. 27, 2007, provisional application No. 61/075,534, filed on Jun. 25, 2008.

(51) Int. Cl.

| | |
|---|---|
| ***G05B 23/02*** | (2006.01) |
| ***G09G 5/00*** | (2006.01) |
| ***G03B 15/02*** | (2006.01) |
| ***F21V 7/04*** | (2006.01) |

(52) U.S. Cl.
USPC ................. 340/3.7; 340/3.1; 345/156; 362/3; 362/600

(58) Field of Classification Search ................... 340/3.7, 340/3.1; 345/156; 700/94
See application file for complete search history.

(56) References Cited

U.S. PATENT DOCUMENTS

| | | | | |
|---|---|---|---|---|
| 4,192,004 | A | 3/1980 | Buerger | |
| 4,392,187 | A | 7/1983 | Bornhorst | |
| 4,875,144 | A | 10/1989 | Wainwright | |
| 5,066,085 | A | 11/1991 | Gimbutas et al. | |
| 5,366,780 | A | 11/1994 | Rapisarda | |
| 5,410,345 | A * | 4/1995 | Eichenlaub | 348/59 |
| 5,416,591 | A * | 5/1995 | Yoshimura et al. | 356/608 |
| 5,581,638 | A | 12/1996 | Givens et al. | |
| 5,629,587 | A | 5/1997 | Gray et al. | |
| 5,988,862 | A | 11/1999 | Kacyra et al. | |
| 6,139,429 | A * | 10/2000 | Shoemaker, Jr. | 463/7 |
| 6,157,449 | A * | 12/2000 | Hajduk | 356/367 |
| 6,320,977 | B1 | 11/2001 | Tokura | |
| 6,628,885 | B1 | 9/2003 | Wilkie et al. | |
| 6,651,365 | B1 | 11/2003 | Wainwright | |
| 6,668,082 | B1 | 12/2003 | Davison et al. | |
| 6,686,701 | B1 | 2/2004 | Fullarton | |
| 6,690,120 | B2 | 2/2004 | Oskorep et al. | |
| 6,851,844 | B2 | 2/2005 | Guy | |
| 6,937,309 | B2 * | 8/2005 | Yamahara | 349/118 |
| 6,965,205 | B2 | 11/2005 | Piepgras et al. | |
| 6,987,258 | B2 * | 1/2006 | Mates | 250/208.1 |
| 7,016,045 | B2 | 3/2006 | Kwon | |

(Continued)

OTHER PUBLICATIONS

International Search Report issued Feb. 12, 2009 in corresponding International Patent Application PCT/US 08/88334.

*Primary Examiner* — Daniel Wu
*Assistant Examiner* — Mohamed Barakat
(74) *Attorney, Agent, or Firm* — Eugene M. O'Donnell

(57) ABSTRACT

The present invention is related to a method, system and apparatus, in particular, a lighting system and method of controlling the lighting system, comprising a computer readable medium and a programmable device capable of controlling and manipulating individually addressable lights to realize a visual display at a pixel level.

26 Claims, 20 Drawing Sheets

U.S. PATENT DOCUMENTS

| | | | | |
|---|---|---|---|---|
| 7,039,216 | B2 | 5/2006 | Shum et al. | |
| 7,064,498 | B2 * | 6/2006 | Dowling et al. | 315/291 |
| 7,137,416 | B2 | 11/2006 | Brochier et al. | |
| 7,139,617 | B1 | 11/2006 | Morgan et al. | |
| 7,186,003 | B2 * | 3/2007 | Dowling et al. | 362/234 |
| 7,234,853 | B2 | 6/2007 | Givoletti | |
| 7,257,551 | B2 | 8/2007 | Oskorep et al. | |
| 7,317,836 | B2 | 1/2008 | Fujimura et al. | |
| 7,353,071 | B2 | 4/2008 | Blackwell | |
| 7,393,108 | B2 * | 7/2008 | Ohnishi | 353/30 |
| 7,733,488 | B1 * | 6/2010 | Johnson | 356/414 |
| 7,960,683 | B2 * | 6/2011 | Kawano et al. | 250/226 |
| 2002/0036777 | A1 * | 3/2002 | Tanaka | 356/401 |
| 2002/0112026 | A1 * | 8/2002 | Fridman et al. | 709/217 |
| 2005/0073845 | A1 * | 4/2005 | Matsui | 362/293 |
| 2005/0275626 | A1 * | 12/2005 | Mueller et al. | 345/156 |
| 2006/0092315 | A1 * | 5/2006 | Payonk et al. | 348/370 |

* cited by examiner

600

900

1100

1200

1500

1600

1700

LIGHTING SYSTEM AND CONTROL METHOD THEREOF

CROSS-REFERENCE TO RELATED APPLICATIONS

This application is related to U.S. Provisional Patent Applications Ser. Nos. 61/009,208 entitled, "A LIGHTING SYSTEM", by Scott A. Jones et al., filed Dec. 27, 2007 and 61/075,534 entitled, "A LIGHTING SYSTEM", by Scott A. Jones et al., filed Jun. 25, 2008 in the United States Patent and Trademark Office, the disclosures of which are incorporated herein in their entirety by reference.

BACKGROUND OF THE INVENTION

1. Field of the Invention

The present invention is related to a method, system and apparatus, in particular, a lighting system and method of controlling the lighting system, comprising a computer readable medium and a programmable device capable of controlling and manipulating individually addressable lights to realize a visual display at a pixel level.

2. Description of the Related Art

In general, the lighting industry has expanded into the area of decorative lighting, and more specifically, into the area of holiday decorations. Representative holiday lighting systems may contain controllers that are capable of controlling individual strands of lights. Thus, a light controlling device is often limited to controlling an entire strand of incandescent and/or LED lights in unison. The controlling device is often a commercially available controller limited to manipulating an entire strand of lights in performing simple functions. In particular, light controllers on holiday light systems may allow a user to turn a light strand on or off. Other light controllers may allow manipulation of an entire light strand to displaying various colors, and/or perform various actions such as intermittent display, or streaming display. However, this method of controlling an entire strand in unity confines the manipulation of light displays to large scale manipulation. To display arbitrary images and/or other media at the pixel level using commercially available controllers and light strands is impossible. Alternatively, other controllable lighting systems may use a light display panel, such as an LED display panel. An LED display panel is capable of integrating individual LEDs together to display an image. While these types of LED display panels may display images on a pixel level, the panels are limited to the manufacturer determined position of lights on the panel. Lights on such panels are unable to be manipulated into varying positions, images, shapes and/or integrated into other non-pre-determined displays as the spatial positioning of individual lights may not be determined. A method of positioning and manipulating individual lights is desired, particularly, a system comprised of randomly distributed individual lights that can be monitored, programmed, and utilized is desired to achieve a level of control of individual lights of random positions.

SUMMARY OF THE INVENTION

A lighting system is provided whereby the system comprises apparatus capable of controlling, and lighting apparatus that is capable of being controlled to display images, video and text utilizing lighting technology. Control of the lighting apparatus may be facilitated through computer readable medium. The computer readable medium may be provided as computer software to be used in detecting, analyzing and programming the lighting apparatus. The lighting apparatus may include a plurality of individual LEDs and/or any other lights combined on lighting strands and/or other structures or fixtures. The controlling apparatus may be comprised of a multimedia or other recording device and/or a lighting controller. The recording device may be provided as a video recorder capable of capturing a position(s) of any lights associated with a lighting apparatus. The lighting controller may be provided as a control box. The control box may include components capable of manipulating the lighting apparatus or structure to display static graphics, animated sequences, scrolling marquees, text and/or videos utilizing any combination of available lights.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
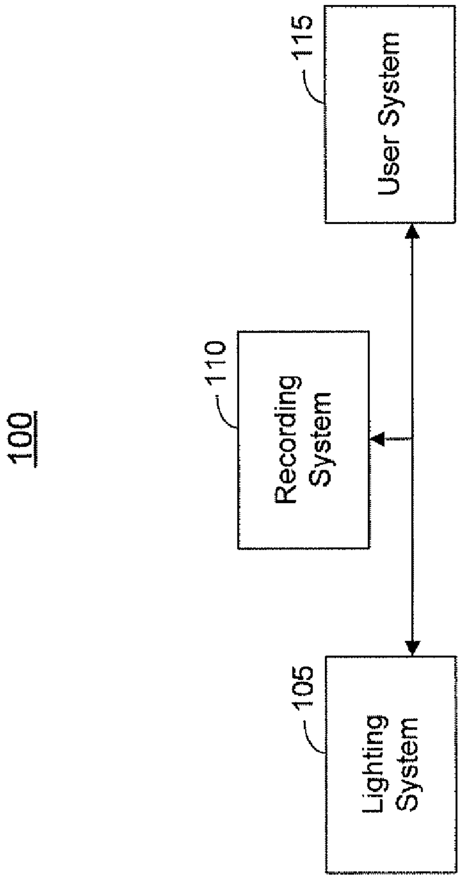
FIG. 1 is a diagram of a system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

A user may be able to place a lighting strand(s) on an object or surface and connect a strand(s) to a controller which may be embodied as a control box. A plurality of strands may be connected together to implement a larger display. A control box may be a single component or multiple controllers may be networked for desired scalability. A user may obtain recorded information of a lighting strand(s) as they are functioning by utilizing any recording device that may be provided internally or externally to the lighting system. The recorded information may include a video capture or other visual record of the lighting strands performing in a predetermined sequence. The video capture may be obtained through open loop and/or closed loop video capture technology. The recorded information may alternatively be information that is not visual, for example, a recording may be taken of ultraviolet, infrared and/or other detectable emissions.

In an alternative embodiment, a user may implement the method of the lighting system by creating and/or using a desired large-scale display by, for example using existing display panels such as LCD display panels, televisions screens or any other units, etc., and detecting the positions of these units. The positions of individual pixels may be obtained by combining the positions of units with predetermined pixel positions or other known positions into the lighting system representative units. A parallel algorithm may be used to identify the position of individual lights in the lighting system. In particular, a first position(s) of a plurality of lights may be identified and a second position(s) of other groups, subgroups and/or other plurality of individual lights may be detected in parallel based on the first position(s).

A computer readable medium is provided which may be embodied as computer software containing a program(s), one of which may implement a graphical user interface for a user to transfer visual information from a recording device to a user system. A program of the computer readable medium may convert the visual information into any known format that is capable of being manipulated on a singular frame level. The visual information may be analyzed by a program of the computer readable medium and 2D and/or 3D positioning of a plurality of individual lights may be determined. A program of the computer readable medium may output a graphical representation of the analyzed video information.

Utilizing the system software, a user is able to select and/or design animated sequences or video, static images, scrolling images and text, and/or other display media or information. The display media may be transferred to a portable memory storage device that is capable of being input into the lighting controller. Alternatively, the display information may be transferred directly to the controller through network cables, port cables, or other wired and/or wireless technology. The controller may be capable of storing various amounts of display information.

The controller or control box may include serial or parallel control circuitry. The controller may be capable of synchronization of an internal timing mechanism with an incoming stream of display information. The controller may capture the incoming stream of display information and process the information for lighting control. The control box may be manipulated or networked to any number of other control boxes and/or other devices with compatible networking capabilities. Compatible devices may be used to activate and/or manipulate any control box components.

Figure 3:
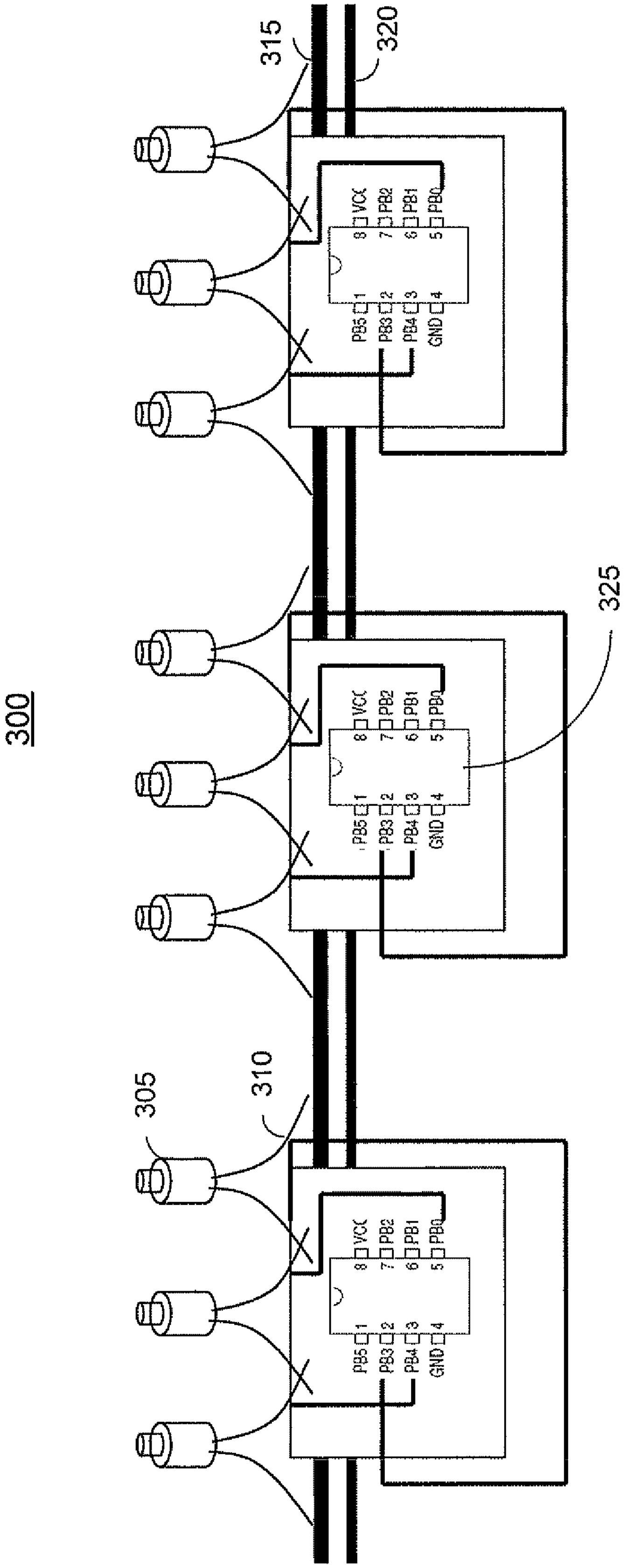
FIG. 3 is a diagram of an exemplary lighting apparatus design.

In FIG. 1, a system 100 is disclosed. The system 100 includes a lighting system 105, a recording system 110 and a user system 115. A lighting system 105 is provided which may include a lighting fixture apparatus, light or lighting controller apparatus, and computer readable medium. In at least one embodiment, the lighting fixture apparatus is comprised of a plurality of individual LEDs combined to form a single strand of lights. However, the lighting fixture may be a grouping of LED display panels, television or other illuminated panels or screens, a plurality of incandescent lights or any other lights combined as a lighting strand, a lighting rod and/or incorporated as any other fixture or structure. The lighting fixture apparatus may be flexible as to be able to be placed in any desired location such as attached to any object or location commonly utilized for lighting decoration, for example, a tree, a fence, etc. The lighting fixture apparatus may be a singular fixture or may be a connection of a plurality of fixtures, such as a series of lighting strands connected together. As illustrated in FIG. 3, and discussed further herein, in at least one embodiment, the lighting fixture apparatus is controllable by implementing microcontrollers that may be manipulated to control a subset of individual lights. For example, as shown in FIG. 3, a microcontroller may be placed every third light in a series of lights.

The lighting system 105 may also contain a light controller apparatus. A light controller apparatus may be embodied as control box as further illustrated in FIGS. 6A-6D. A light controller is provided to manipulate the lighting fixture apparatus. In at least one embodiment, the lighting fixture apparatus may be connected to the controller by means of a wired connection. The connection may be an electrical cord, and/or may be any wired and/or wireless connection capable of facilitating communication between the controller and the lighting fixture. In a preferred embodiment, the lighting fixture apparatus and the controller are two separate components of the lighting system; however, the lighting fixture and the controller may be coupled together into one component, or may alternatively be any number of separate components.

The lighting fixture apparatus may be manipulated by the lighting controller by utilizing a computer readable medium provided in the lighting system 105 as computer software. The computer software may be implemented as a program on the user system 115. In at least one embodiment, the computer software may be provided to a user as a series of graphical user interfaces (GUIs). Utilizing such interfaces, a user may be able to select and/or design an animated sequence, static image, scrolling image or text, and/or other display information. The computer readable medium as implemented on the user system 115 may be capable of utilizing input information from the recording system 110 and/or providing output information based on the selected and/or designed display information. The output information can be transferred to and/or utilized by the light controller apparatus. The output information may be transferred to a portable memory storage device, or any other device that is capable of being associated with the light controller. Alternatively, the output information may be transferred directly or indirectly to the light controller through network cables, port cables, or other wired and/or wireless technology.

The light controller may be capable of reading, analyzing, manipulating and/or storing various forms of display information. The light controller may include several components, such as a serial or parallel control circuit, an internal timing mechanism, a port(s), means for connecting to the lighting fixture apparatus, means for connecting to an external power or energy source, an internal energy source, and/or various internal or external controls. The light controller may be capable of synchronization of an internal timing mechanism with an incoming stream of display information as provided by utilizing the computer software. The light controller may capture an incoming stream of display information and process the information for lighting control of the light fixture apparatus. The light controller may be manipulated by and/or networked to any number of other controllers and/or other devices with compatible wired and/or wireless network capabilities. For example, other compatible devices, such as a remote control may be used to activate and/or manipulate the controller and any of its components.

A recording system 110 may be provided as part of the system 100. A recording device may be included in the system 100 as an individual component, or it may be provided internally or externally to any other component of the system. For example, the recording device may be incorporated into another component of the system, such as the lighting controller. The recording device may be a digital camera, video recording device, and/or any other device capable of capturing visual or other detectable information. The visual information may include a video capture of any light(s) of the lighting fixture. For example, the visual information may be a video capture of a plurality of LEDs flashing in a predetermined sequence. The video capture may be obtained through open loop and/or closed loop video capture technology. The visual information may be transferred from the recording device directly or indirectly to the user system 115. The transfer of visual information from the recording device to the user system may be facilitated by utilizing a portable memory storage device, such as a camera memory card, or any other memory storage device capable of being read by the computer system. Alternatively, the recording device may be connected to a user system via any wired and/or wireless connection capable of facilitating communication and/or data transfer.

The user system 115 is provided in FIG. 1. The user system 115 may be any typical desktop or laptop system, such as a PC, a handheld computer such as a personal digital assistant (PDA), or any other device that may allow a user to import, analyze, and/or manipulate any visual information recorded via the recording system 110. The user system 115 may be any device that is capable of reading the visual information and/or capable of performing analysis of such visual information. The user system 115 may perform an analysis of visual information via any computer readable medium that may be provided as software or any other type of program that may be used in the analysis and/or manipulation of the recorded visual information. The computer readable medium of the lighting system 105 may be implemented on the user system 115 to analyze the position of any lights associated with, and/or resident in the lighting fixture apparatus. The computer readable medium may convert the visual information into any known format that is capable of being manipulated on a singular frame level. The visual information can be analyzed by the computer readable medium, and a 2D and/or 3D positioning of the plurality of individual lights can be determined. Utilizing the computer readable medium, the lighting system 105 may be able to analyze the visual obtained by the recording system 110 and be able to output a graphical representation of the analyzed visual information to the display of the user system 115.

Figure 2:
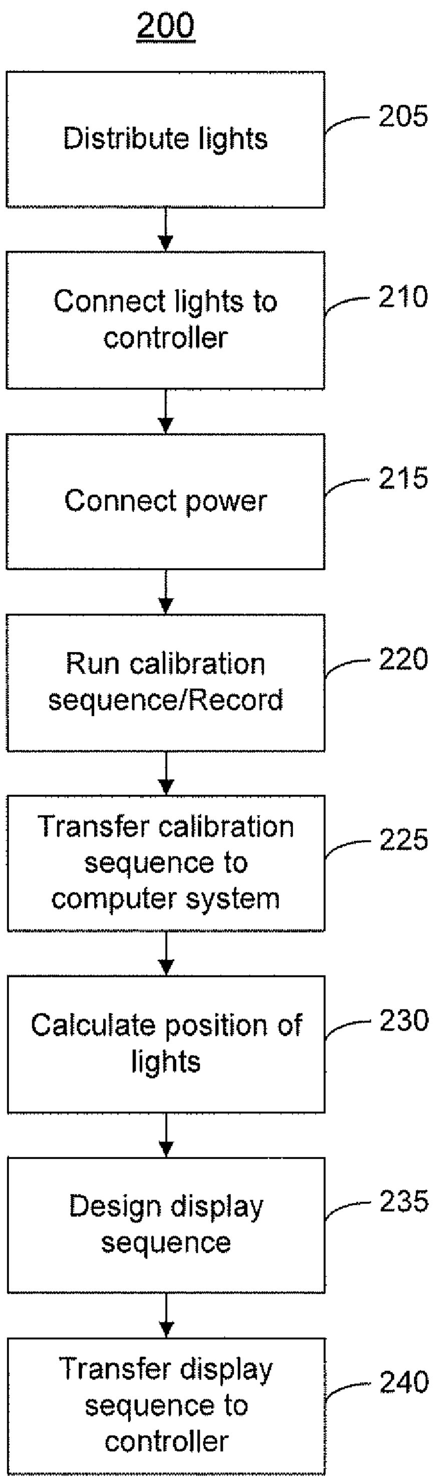
FIG. 2 illustrates a flow diagram of a system process.

In FIG. 2, a flow diagram of the process 200 is shown. In operation 205, a user distributes any lighting fixture(s) of the lighting system 105 (FIG. 1) and any associated components, such as any associated lighting controllers, to a desired location(s). For example, a lighting fixture, which may be embodied as a strand including a plurality of lights, may be placed on an object, such as a tree, a house, a fence, or any other object or location capable of supporting the lighting fixture. If the lighting fixture has been distributed as desired, control is passed to operation 210 and process 200 continues.

In operation 210, a user associates a lighting fixture(s) with a light controller(s) via a connection. The lighting fixture may be two or more lighting fixtures coupled together, and associated with one or more controllers. The lighting fixture(s) can be connected to the controller(s) via a connection which may be any physical connection, for example, an electrical cord on a lighting fixture embodied as a strand of lights may be connected to a receiving port on the light controller. The connection may be any wired or wireless connection that facilitates communication between the light controller(s) and the lighting fixture(s). The controller may be able to connect to any number of lighting fixtures through any number of connections. In addition, the controller may be coupled with additional controllers and/or other devices for scalability of the system. If operation 210 is complete, control is passed to operation 215 and process 200 continues.

In operation 215, a light controller(s) is powered. The powering of a light controller may be achieved through connection to any power source, such as a standard electrical outlet, any stand-alone power source, such as a generator, a battery, etc., or any other source capable of providing power to the controller. The power source may be supplied as AC and/or DC power. Alternatively, the light controller may be provided with an internal power source such as a battery to facilitate operation. If operation 215 is complete, control is passed to operation 220 and process 200 continues.

In operation 220, a sequencing event including any lights incorporated in or associated with the lighting fixture apparatus is performed and recorded. The sequencing of lights may be based on a predetermined sequence. For example, program code calling a function for turning lights on and off may be provided to manipulate any microcontrollers associated with individual lights. A resulting intermittent and/or 'flashing' lights may be displayed on any lighting fixture(s) resulting from the distribution of lights performed in operation 205. A sequence of 'flashing' lights may include a plurality of lights flashing in unison, individual lights flashing in a predetermined order, a predetermined pattern of individual and/or a plurality of lights flashing at various times, or any other sequence of lit and/or unlit lights. The sequencing event of the lights may serve as a calibration of the lighting system display by utilizing any lights as static reference points. The sequencing event may include any number of synchronization frames to enable the lighting system to overcome the inaccuracy of capturing a frame rate of an associated recording device. Any sequence of flashing lights may vary based on conditions such as size of the lighting fixture(s) and associated lights, for example, a lighting fixture embodied as a light strand with a light count greater than a certain threshold of light nodes may cycle through a different sequence than a light strand with a light node count less than or equal to the threshold.

In at least one embodiment, a sequencing event may be embodied as a parallel mapping algorithm used for a calibration of the lighting system. For example, to decrease a number of frames required to calculate positions of all lights associated with a lighting system, a parallel sequence display of any number of lights may be performed. Using a method of parallel mapping, a calibration of a lighting position(s) may be scalable. In at least one embodiment, a lighting fixture apparatus embodied as a lighting strand(s) and a plurality of lighting controllers as control boxes may comprise an overall lighting system. Using this embodiment, an illumination of all lights associated with all control box(es) may be a first tier of a parallel mapping algorithm to determine a distribution of all lights, and a second tier may be separate concurrent or parallel illuminations of all lights associated with each of a plurality of control box(es) to determine a distribution of all lights associated with each of the separate control boxes. A third tier of the parallel mapping algorithm may be separate concurrent or parallel illuminations of all lights associated with each of a plurality of individual channels or channel ports associated with the control box(es). A fourth tier of the parallel mapping algorithm may be separate concurrent or parallel illuminations of all lights associated with each of a plurality of individual lighting strands associated with each of the channel ports of each of the control box(es). A fifth tier of the parallel mapping algorithm may be separate concurrent or parallel illuminations of each light associated with each of a plurality of lighting strands associated with each of the channel ports of each of the control box(es).

Using the exemplary embodiment of the lighting system above, a lighting system may comprise three communicatively coupled control boxes of sixteen channel ports for each control box, three light strands for each channel port and ninety-nine lights for each light strand. In implementing a parallel mapping algorithm, a first step may be illuminating all lights associated with the three control boxes to identify a total light distribution area and/or pattern associated with the overall lighting system. A second step may be separately illuminating all lights associated with each control box to identify a separate light distribution and/or pattern associated with each control box. A third step may be separately illuminating all lights associated with each of the channels, with each of the three control boxes performing this illumination step concurrently. A fourth step may be illuminating all lights associated with each light strand separately, with all sixteen channels for all three control boxes performing this illumination step concurrently. A fifth step may be illuminating each light separately on every light strand, with all light strands performing this illumination step concurrently. Information obtained by performing this parallel mapping algorithm may be combined and used to facilitate determining an indexing or positioning of each light, light strand, channel, and/or control box.

A predetermined sequencing program code may be resident in the light controller such that the controller is capable of manipulating the lights to run the predetermined sequence. Alternatively, the program code may be transferred directly from a computer system and/or transferred by any commonly known removable or portable memory storage devices. For example, in at least one embodiment, the program code associated with a calibration sequence is written to an SD card capable of being inserted directly into the light controller much like the memory card of a digital camera or other device. The sequencing event may be initiated by a button, switch, or any other control associated directly on or with the light controller, or by a control associated remotely and/or indirectly with the controller, such as a remote control, a control on a computer system, and/or any other device capable of communication with the controller whether by wired, or wireless communication. The sequencing event may be utilized to determine an initial location or position of individual lights. The sequencing event of the lights may be recorded via a recording device associated with the recording system 110 (FIG. 1).

The recording of the sequence event may be performed via a recording device included in the lighting system, or by any other device capable of providing suitable visual or other information for analysis. The recording of the sequencing event may be performed by open loop capture, such that a user may utilize his or her desired recording device. Alternatively, the recording of the sequencing event may be performed by closed loop capture, such that a recording device is connected to and/or associated with the light controller, thus providing for synchronization of the recording device by the controller. The recording of the sequencing event may be performed to obtain visual information of a 2D and/or 3D position(s) of any lights associated with the lighting fixture(s). A 3D position of any lights may be facilitated by the recording device by performing any recording(s) of the lights from different angles and/or directions. The recording device associated with operation 220 may be arranged at any suggested and/or desired location relative to the lighting fixture(s). The recording device may have a suggested location relative to the location of the lighting fixture. For example, a suggested range for a physical distance between the recording device and any lights may be provided, such as, 'three to five feet away from the lighting fixture.' Alternatively, a recording device may be placed at any location relative to the lighting fixture(s) that may provide for a visual representation of the entire distribution of lights desired to be utilized in a display. A user may be instructed to maintain a manual focus on the recording device being used. For example, if an auto-focus or other automatic focus function of a camera or other recording device is used, an overall distortion or 'blurring' may occur as the sequencing event occurs. In at least one embodiment, a recording device may be used to obtain only the key frames required for calculating light position(s). For example, a plurality of static images obtained from a camera, such as a digital camera, may be captured at different time(s) and/or locations. Using the above example, the static images may be translated, modified, resized and/or rotated to overcome the problem of position change of camera between different frames. A plurality of key frames may be captured and utilized to obtain the position(s) of any lights associated with a lighting fixture apparatus. Alternatively, a closed loop recording method may be used. If the recording of operation 220 is complete, control is passed to operation 225 and process 200 continues.

In operation 225, the visual or other information obtained during the sequencing event is transferred to a computer or other user system capable of reading, analyzing, and/or manipulating the information. The visual information may be transferred from the recording device directly or indirectly to a computer system. The transfer of visual information from the recording device to the computer system may be facilitated by utilizing a portable memory storage device, such as a memory card, or any other memory storage device capable of being read by the computer system. Alternatively, the recording device may by connected to the computer system directly or indirectly via any wired and/or wireless connection capable of facilitating communication and/or data transfer. If operation 225 is complete, control is passed to operation 230 and process 200 continues.

In operation 230, a user system that has been provided with program code and any associated data of the computer readable medium of the lighting system may be utilized to initialize the reading and/or analyzing of the visual information obtained during the recording of the sequencing event of operation 220. The computer readable medium, embodied as computer software, may include a file conversion program, a program to read, analyze, and manipulate the visual information, an interface(s) for user selection of display information, and other data and/or information used in facilitating the output display information that may be transferred to the light controller. In at least one embodiment, a software package is provided that may include a file conversion program, such as any open-source video conversion utility capable of converting the visual information obtained via the recording device to any desired file format. For example, the original visual information transferred to the computer system may be converted to compressed AVI file format via the file conversion program. The file format of the converted visual information may be any format that can allow individual frames of visual information to be extracted from the entire file. Extraction of individual frames may be facilitated by using any software application programming interface, or any other software and/or codec capable of extracting individual frames.

If the visual information is converted to a file format supported by the software program, the program may read the converted visual information, and process and/or analyze the images obtained. For example, the program may read a first frame of the converted visual information, and thus be capable of reading any dimensions of the visual information, such as dimensions of a video frame, any codec and/or software used to convert and/or compress the visual information, information associated with the recording device, such as frame rate, etc., and/or any other information available. A first frame of the converted visual information may be obtained by bypassing a portion of the visual information. For example, if a sequencing event is initiated, a 'flashing' of all lights associated with the lighting fixture(s) may be performed to indicate that the sequencing event has commenced, and such a 'flashing' of all associated lights may be bypassed as any initial 'flashing' of lights may, for example, interfere with the program reading, analysis and/or processing of the visual information. A bypassing of a portion of visual information may be based on a time period, a frame set, or any other measurement or element.

If the visual information is read by the computer system, the program may process and/or analyze the images contained in the visual information. An analysis of the visual information may be done on an individual frame basis. An analysis of the visual information may include locating a first frame where a percentage and/or threshold of all lights associated with a lighting fixture are illuminated, locating subsequent frame(s) in which a percentage or threshold, which may be based on a first frame reading of all lights associated with the lighting fixture are illuminated, and/or any other analysis of the visual information. In performing an analysis on light illumination of the visual information, the program may initially set a threshold value. A threshold value may be a certain percentage associated with a total. A threshold value may be used to determine whether a frame of visual information is considered a frame having all of the lights associated with the light fixture illuminated.

In determining whether a frame of visual information is considered a frame having all of the lights associated with the light fixture illuminated, a frame of visual information may be analyzed based on a portion of the frame, for example, analysis may be initially based on any number of lights. A frame of visual information may be analyzed based on an individual light. In considering whether an individual light is considered by the program code to be illuminated, the visual information associated with the light may be analyzed. For example, a pixel, or any other measurement of the visual information may be analyzed to determine illumination of a light. An analysis of a measurement of the visual information may be based on any component level(s). For example, a pixel may be considered a possibility for illumination of a light if any, or all component level values of a pixel reach a certain threshold. For example, if a red, a green, and/or a blue component associated with a pixel meets, and/or exceeds a certain threshold value, the pixel may be considered an illuminated pixel associated with an illuminated light. A threshold value may be based on a percentage applied toward a total value. For example, a threshold value may be a percentage of a total intensity value associated with a light.

In determining whether a frame of visual information is considered a frame having all of the lights associated with the light fixture illuminated, an analysis of visual information based on any portion of the frame may be utilized. For example, the information obtained from analysis of an individual pixel(s) of the visual information may be utilized in determining an overall illumination of a frame. A threshold value may be utilized. A threshold value may be based on a percentage applied toward a total value. For example, a threshold value may be a percentage of a total pixel count or dimension of a frame of visual information. A total pixel count or dimension of a frame of visual information may be obtained by various methods. For example, the height may be multiplied by the width of a frame of visual information to determine overall pixel count of a frame of visual information. A threshold value of the total pixel count may be taken. A threshold value may reflect the minimum illumination requirement of a frame that may be utilized to consider a frame of visual information a frame having all of the lights associated with the light fixture illuminated. An illumination requirement may be met by analyzing a portion of a frame of visual information, for example, the analysis of illumination of individual pixels of a frame may facilitate determination of illumination for the entire frame. In determining whether a frame of visual information is considered a frame having all of the lights associated with the light fixture illuminated, any subsequent threshold value(s) may be set based on actual illumination determined in a frame of visual information. For example, if a frame of visual information contains 9000 pixels that are considered illuminated pixels and thus illuminated lights, but the threshold value for considering a frame of visual information a frame having all the lights associated with the light fixture illuminated was initially set to reflect 6000 pixels, then a new threshold value to determine whether a subsequent frame is considered an illuminated frame may be based on the pixel analysis resulting in a count of 9000 pixels.

The software or program code may continue to analyze any and/or all the visual information associated with the sequencing event in determining the position(s) of lights. The program may continue until all frames associated with the visual information are read and analyzed. The program may determine an average and/or representative frame of the lighting fixture distribution by utilizing any information obtained during the analysis of the visual information. An average frame may be utilized in subsequent analysis of individual lights of the lighting fixture(s). For example, analysis of all frames associated with the visual information may yield individual values that may be totaled and averaged into a representative frame of visual information considered a frame of visual information with all lights associated with the light fixture illuminated. Alternatively, in at least one embodiment, a representation of light positioning may be produced manually or by a coupling of automatic detection utilizing the software code and manual inclusion of light positions using a matrix or sectional system. For example, if in operation 205, a lighting fixture(s) is distributed in a grid format or other uniform positioning, then an axis positioning of lights may be produced by utilizing a simple graphing program. Whether obtained automatically, manually, and/or by a combination of both methods, the representative frame of visual information may be utilized in determining the positioning of the lights associated with the lighting fixture(s).

A program may continue to analyze any and/or all the visual information associated with the sequencing event. The program may continue to analyze any frames in determining if a frame is considered to be a frame with potential of any lights associated with the light fixture illuminated. For example, the program may continue to analyze the visual information on a singular frame level, and thus determine whether any pixel associated with a frame meets and/or exceeds a certain threshold value set to determine if a pixel is considered to be associated with an illuminated light. The program may continue to analyze any light potential of any individual pixel, and/or any other portion, or measurement associated with a frame of visual information to determine any and/or all light potential associated with any and/or all frames of visual information. This analysis may be used to determine the location and/or maximum intensity and/or illumination information of any components associated with a pixel, section, sector, and/or frame of visual information. The resulting illumination information may be used to create a histogram and/or any other textual, pictorial, graphical, or any other type of representation of the information. A representation of light illumination information may be any set of coordinates, such as axes coordinates, which may be utilized in facilitating the mapping and/or locating of any lights associated with a light fixture(s). The locating of any lights associated with the light fixture may represent a 2D and/or 3D location(s) or position(s) of individual lights. In locating or detecting position(s) of lights associated with a light fixture (s), the locations may be utilized in designing a display pattern, graphic, animation, and/or any other static or animated visual display utilizing the location determined lights associated with the light fixture(s). If operation 230 is complete, control is passed to operation 235 and process 200 continues.

In operation 235, a user is provided with the ability to select and/or design display information. For example, the program code associated with the computer readable medium of the lighting system 105 (FIG. 1) may include a software program that provides a user with the ability to design display features, images, text, graphics, animations, effects and/or any other elements of visual information that may be included in a display, sequence, effect and/or other visual program or display utilizing any lights associated with the light fixture(s). A user may be provided with selections or selectable options via a graphical user interface(s) (GUIs) as further illustrated in FIGS. 9-17. A user may be provided with the ability to design his or her own display based on any given display features, and/or the ability to design and/or program his or her own features or elements. As discussed further herein, a display(s) utilizing light positions as well as non-positional effects may be designed and displayed. For example, a user may desire to display a chasing effect, a twinkling effect, and/or other commonly known lighting effects that are not dependent on determining the spatial positioning of lights associated with a lighting fixture(s). Alternatively, a user may utilize any existing image, video or other multimedia programs or software to create or generate a video sequence to be used by the software program. If operation 235 is complete, control is passed to operation 240 and process 200 continues.

In operation 240, any display information designed and/or selected in operation 235 is output to the lighting controller. The controller may be capable of synchronization of an internal timing mechanism with an incoming stream of display information. The controller may capture the incoming stream of display information and process the information for lighting control. A controller may receive information by any means available, by for example, any display information may be output to a removable memory storage device, such as any MultiMediaCard (MMC), for example an SD card, etc. The controller may manipulate any microcontrollers of the associated lights to display the display information designed and/or selected by the user in operation 235. Any number of controllers may be used to control any number of lights. For example, in at least one embodiment, a controller may be limited to controlling a certain number of light strands based on the power output capabilities of the controller, and thus for example, several controllers may be coupled together so that a plurality of controllers may be used to control a larger amount of light strands. Operation 240 may continue until a user selects to discontinue display of the lighting system, and/or a user selects to return to a preceding operation to change a distribution of any lighting fixture(s), change any display features, etc.

FIG. 3 illustrates an exemplary lighting apparatus with microcontroller implementation. As illustrated in FIG. 3, the lighting fixture apparatus 300 is embodied as a strand of lights including a light emitting diode (LED) 305, LED lead wires 310, strand ground wire 315, strand power wire 320, and microcontroller 325.

The LED 305 may be any type, size or shape LED. For example, the LED 305 may be a monochrome LED, an RGB and/or multi-color light such as any bi-color and/or tri-color LED that may be commonly known. Alternatively, the LED 305 may be any light source such as a liquid crystal display (LCD), an organic light emitting diode (OLED), an incandescent light, or other lamp. As illustrated in FIG. 3, and in at least one embodiment, a plurality of LEDs is connected in series along a strand. The LED lead wires 310 include an anode and a cathode lead as commonly known and associated with a diode. Utilizing the lead wires 310, the LED 305 can be connected to a power supply facilitated by the power wire 320. Additionally, the LED 305 may be connected to the ground wire 320.

As illustrated in FIG. 3, the microcontroller 325 may be any low feature microcontroller capable of performing simple functions or existing light or LED drivers. For example, as shown in FIG. 3, an 8-bit microcontroller, such as an Atmel ATtiny13 microcontroller with built-in oscillator may be used. As illustrated in FIG. 3, the microcontroller 325 includes a supply voltage, a ground and a 6-bit bi-directional I/O port with internal pull-up resistors. The microcontroller 325 may be capable of manipulating lights, such as the LED 305 by utilizing pulse-width modulation (PWM) from data received on an asynchronous communication line. The microcontroller 325 may be paired with a decoupling capacitor for use in a DC circuit configuration such as that illustrated in FIG. 5A. Alternatively, the light controller may be embodied in an AC configuration as further discussed herein with respect to the light control circuitry illustrated in FIG. 5B.

In at least one embodiment, the lighting apparatus 300 of FIG. 3 may include a strand controller. For example, for each lighting apparatus embodied as a strand of lights, a strand controller may be provided to transfer data from the lighting controller or control box of the lighting system 105 (FIG. 1) to each strand of lights and/or from each strand of lights to the lighting controller.

Figure 4:
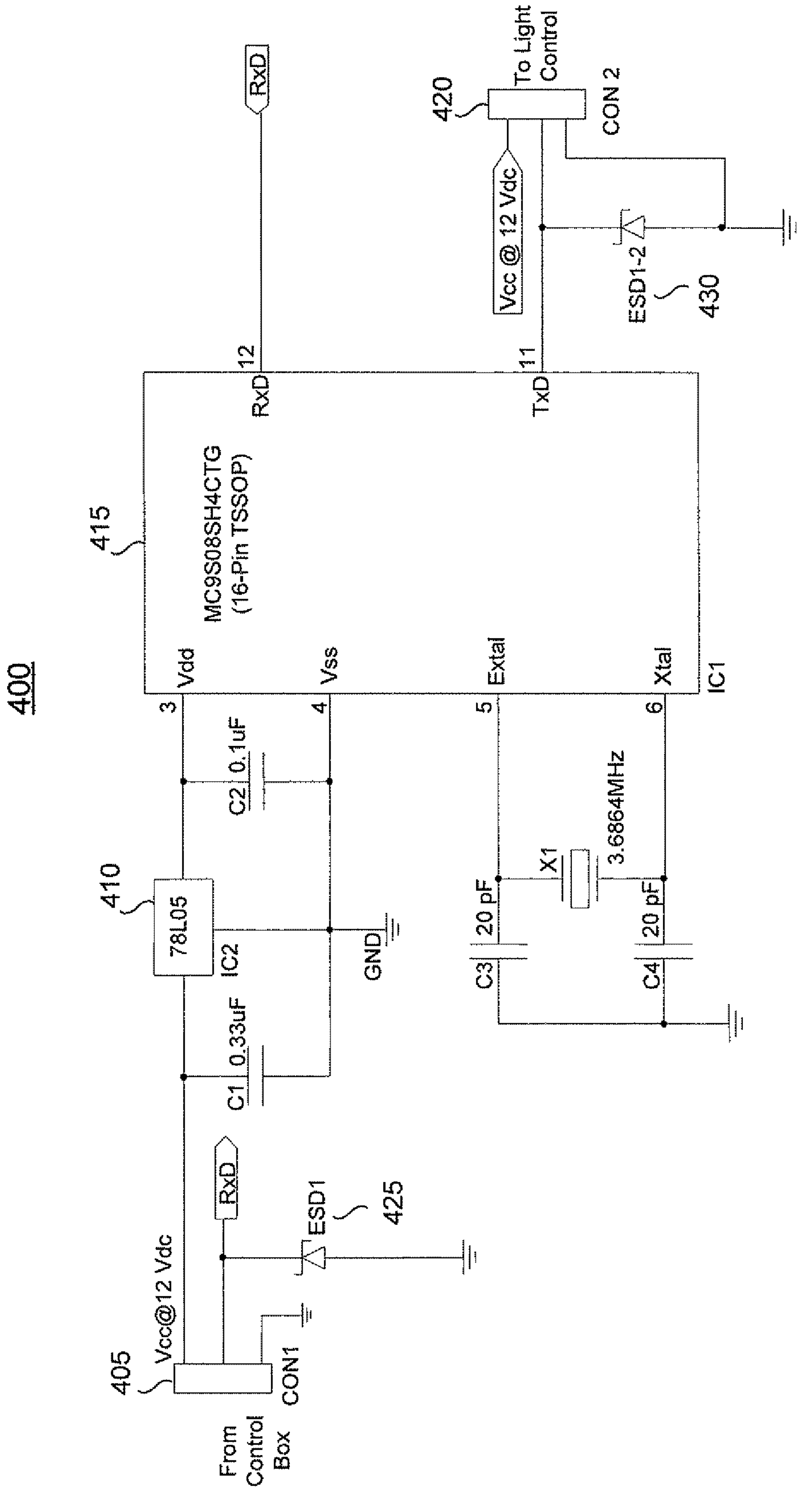
FIG. 4 is diagram of an exemplary strand control circuit.

FIG. 4 illustrates an exemplary light strand microcontroller unit (MCU) and associated strand controller integrated circuit 400. The strand controller circuit 400 includes a receiving control signal 405; positive regulator 410, MCU 415, transmitting control signal 420, ESD1 425 and ESD1-2 430.

Figure 5A:
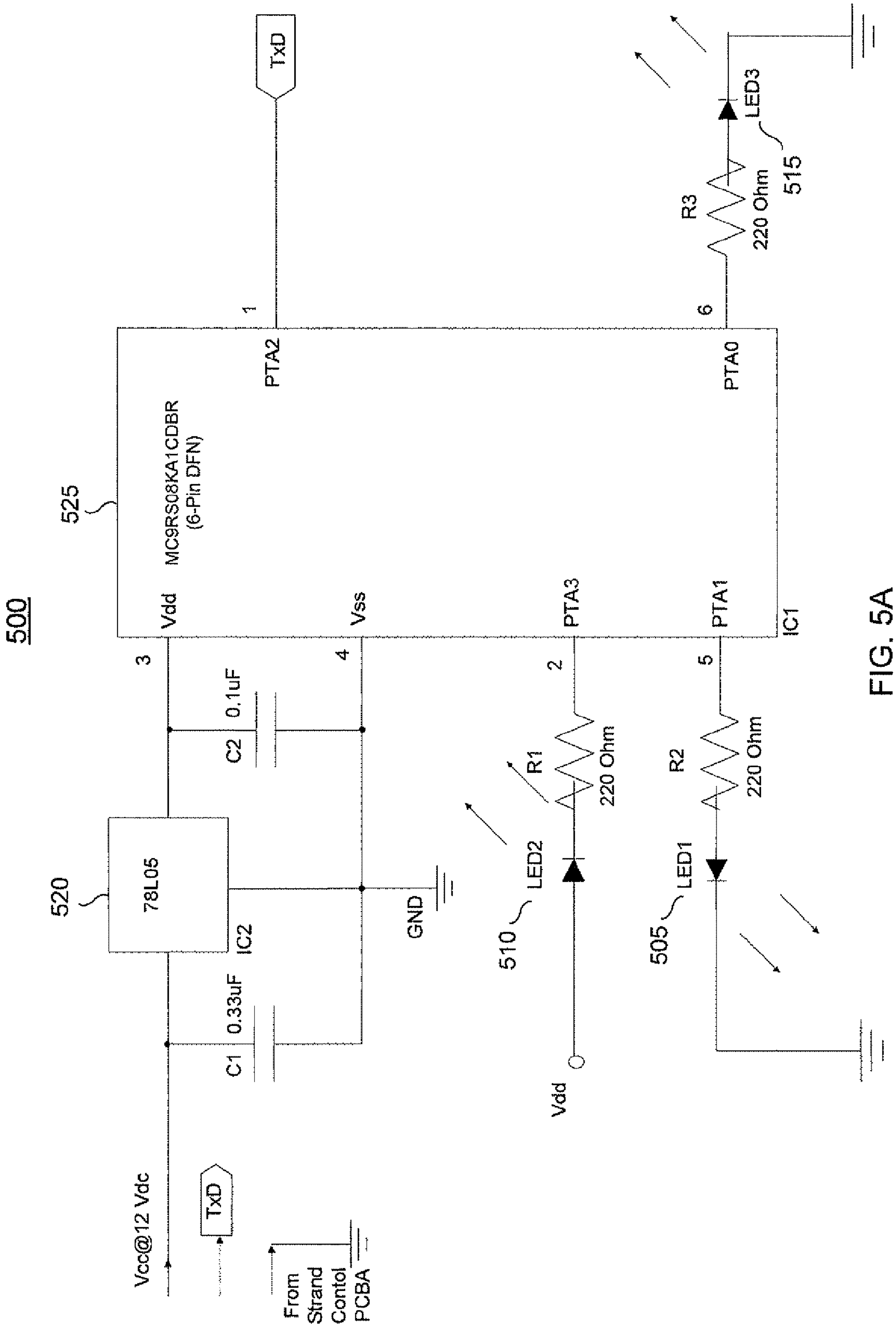
FIG. 5A is a diagram of an exemplary light control circuit.

A strand controller may be connected at the beginning of a strand of lights. As illustrated in FIG. 4, a receiving control signal 405 receives data from the lighting system controller or control box. The positive regulator 410 maintains a constant voltage through the strand controller circuit 400. The receiving control signal 405 may be received by a built-in serial communications interface of the MCU 415 and/or by a software implemented interface or GUIs. Alternatively, communication protocols, such as TCP/IP, inter-integrated circuit control ($I^2C$) and/or other multidirectional, 1-wire, 2-wire and/or any other communication protocols may be utilized for communication among the lighting controller or control box and the strand controller. The MCU 415 may be any microcontroller capable of sending and receiving data for each light strand. As illustrated in FIG. 4, the MCU 415 is a commonly available 8-bit microcontroller unit. The transmitting control signal 420 transmits data from the MCU 415 to the light controller, such as the light controller 500 (FIG. 5A). The strand controller circuit 400 also contains electrostatic discharge controls ESD1 425 and ESD1-2 430 to dissipate electrostatic charge(s).

To control individual lights of a lighting fixture(s), the transmitting control signal 420 (FIG. 4) from the strand controller circuit 400 may be transferred to the light controller, such as the light controller illustrated in FIG. 5A. FIG. 5A illustrates an exemplary light controller circuit 500. The light controller circuit 500 includes LED1 505, LED2 510, LED3 515, a light control positive regulator 520 and a light control MCU 525. The light controller circuit 500 illustrates the process of receiving a transmitted signal from the strand controller to facilitate the individual control of a plurality of LEDs. As illustrated in FIG. 5A, the light controller 500 contains LED1 505, LED2 510, and LED3 515 connected in series along the circuit. FIG. 5A illustrates a light controller capable of controlling three LEDs, however additional embodiments may have a light controller that controls any number of lights or LEDs. In at least one embodiment, a light strand includes ninety-nine monochrome LEDs connected in series, therefore, each MCU controlling three lights each may be addressed from a numerical range, such as, for example, the range 1-33.

The light control positive regulator 520 maintains a constant voltage through the light controller circuit 500. The light control MCU may be any microcontroller capable of sending and receiving data. As illustrated in FIG. 5A, the MCU 525 is an inexpensive low-pin count 8-bit microcontroller with a built-in 8-bit modulo timer. The MCU 525 may be any commonly known microcontroller with an internal clock source for running the light controller program code and/or modulo timer used to maintain current intensities of the LEDs during any periods of idle control signal. The central component of the modulo timer is the 8-bit counter with a timer overflow interrupt that can be enabled to generate periodic interrupts for time-based software loops.

Figure 5B:
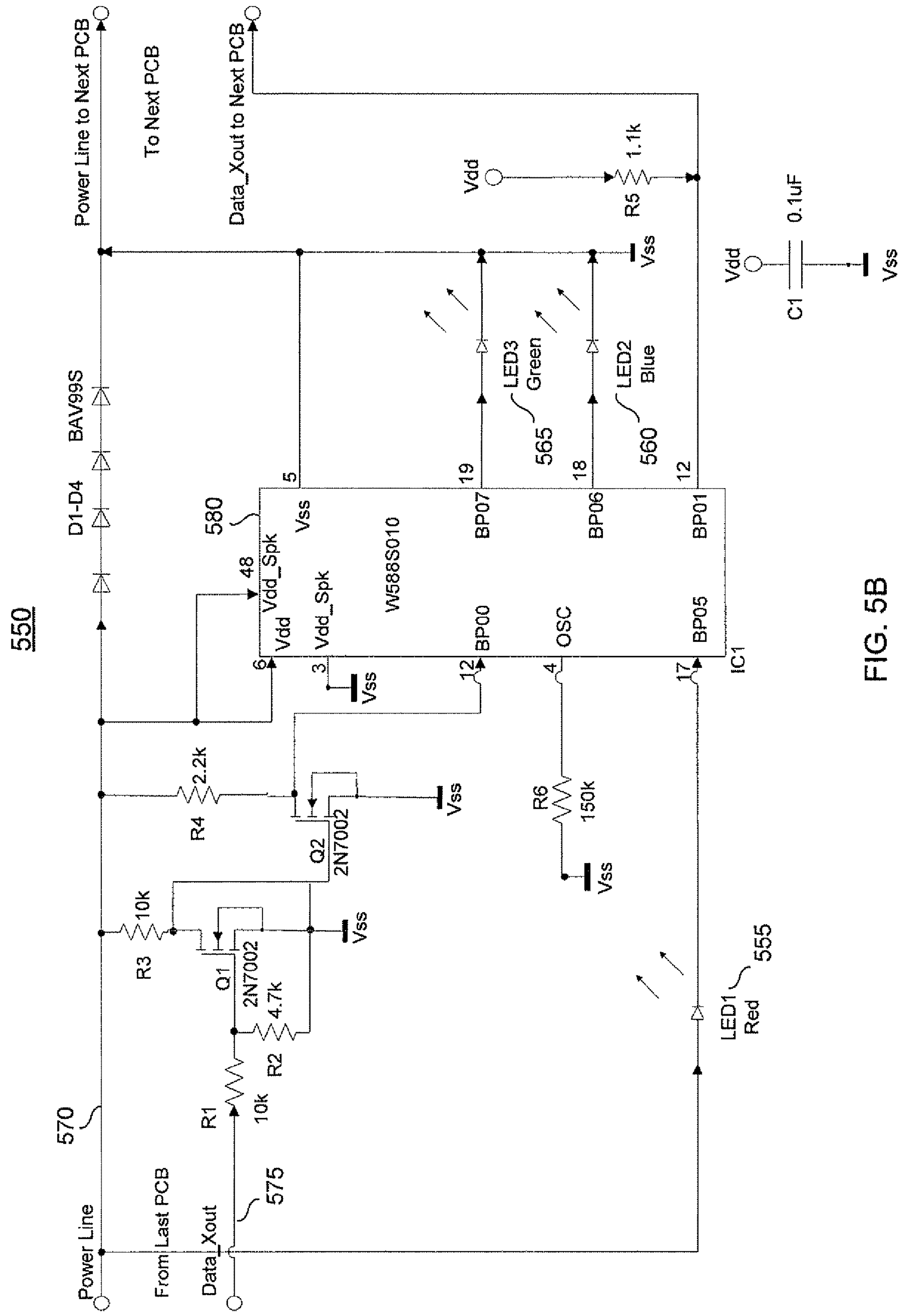
FIG. 5B is a diagram of an exemplary light control circuit.

FIG. 5B illustrates an exemplary RGB light controller circuit 550 utilizing an AC power source. The RGB light controller circuit 550 includes LED1 555, LED2 560, LED3 565, power line 570, data line 575, and light controller MCU 580. The RGB light controller circuit 550 includes a red LED1 555, a blue LED2 560 and a green LED3 565. The power line 570 is the power source for the circuit 550 and the data line 575 is used to transmit a signal from the strand controller, such as the strand controller 400 (FIG. 4) or a previous light controller if the light controller 550 (FIG. 5B) is at least a second light controller in a series. The MCU 580 may be any microcontroller capable of sending and receiving data. As illustrated in FIG. 5B, the MCU 580 is an 8-bit microcontroller with direct-drive PWM output. While the exemplary embodiment utilizes PWM communication, any other communication method, such as power line communication (PLC) and/or any other system of communication for carrying data on a conductor or otherwise may be implemented.

The exemplary light controller circuits of FIGS. 5A and 5B are only two such embodiments of a light controller of a lighting fixture apparatus of the lighting system 105 (FIG. 1). Other embodiments may exist that are commonly known.

Figure 6B:
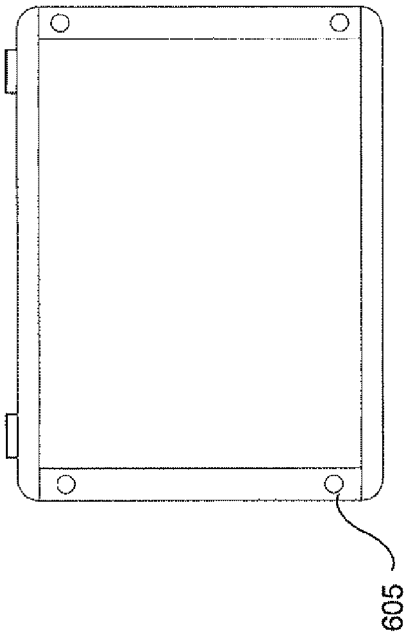
FIGS. 6A-6D illustrate an exemplary system controller.
Figure 6D:
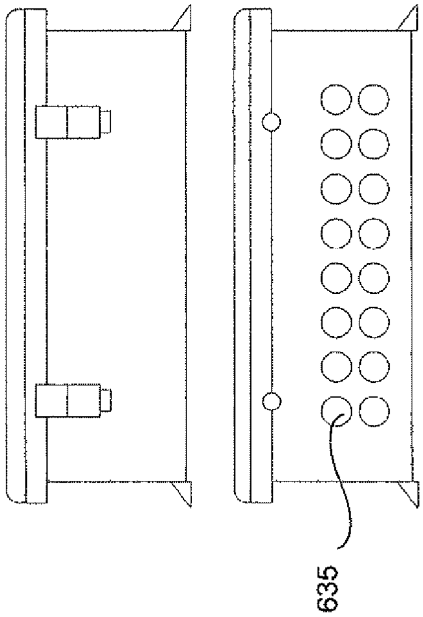
Figure 6A:
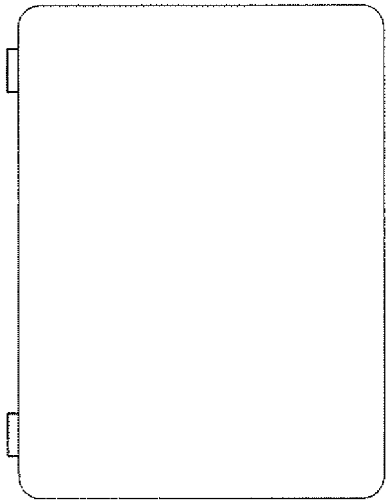

FIGS. 6A-6D illustrate an exemplary lighting controller of the lighting system 105 (FIG. 1). FIG. 6A illustrates a top view of the enclosure of a lighting controller embodied as a control box 600. In at least one embodiment, the control box 600 is a durable and/or weatherproof enclosure capable of entirely containing the lighting controller components. FIG. 6B is a bottom view of the control box 600. As shown in FIG. 6B, a bottom portion of the control box 600 may contain a plurality of openings 605. The openings 605 may be sized as to accept a nail, a screw or any other securing or anchoring means. For example, a user may desire to mount or secure the control box 600 to an object or location by means of threading a screw through the openings 605 into, for example, a post, a wall, etc.

Figure 6C:
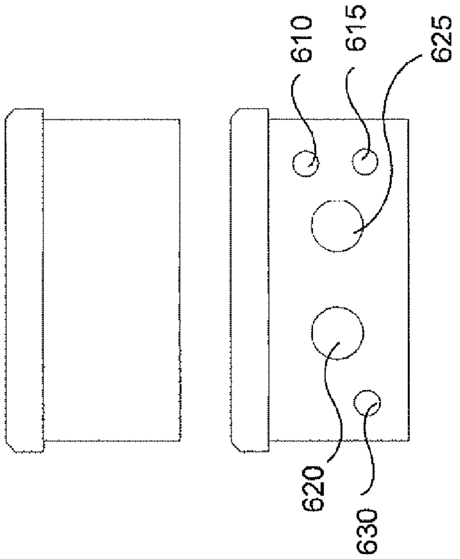

FIG. 6C illustrates an exemplary rear and front view of the control box 600. As illustrated in FIG. 6C, the front of the control box 600 contains the signal cord port 610, the power cord port 615, the output fan 620, the intake fan 625 and the network connection port 630. The signal cord port 610 may accept any standard electrical cord and/or other cord or cable to serve as a signal input to the lighting controller of the control box 600. For example, an electrical cord leading out from the signal cord port 610 may be connected to other control boxes, a third party controller and/or other devices. By utilizing the signal cord port 610, a user may connect the control box 600 to a signaling device that may signal or trigger the microcontroller unit of the lighting controller of the control box 600 to read, process, integrate and/or synchronize received information. The power cord port 615 may accept any standard electrical cord and/or other cord or cable to serve as a connection between the power source and the control box 600. For example, an electrical cord leading out from the power cord port 615 may be connected to a standard wall outlet to provide power to the control box 600.

As illustrated in FIG. 6C, the output fan 620 and the intake fan 625 may be included in the control box 600. The output fan 620 may output heated air from inside the control box 600 that may be a result of a prolonged and/or continuous use of the control box 600. The output fan 620 and the intake fan 625 may cycle continuously or they may be triggered to initiate performance upon an internal temperature sensor, a timing clock, etc. The intake fan 625 may input cooled air into the control box 600 that may be used to cool down any components inside the control box 600 that may need to maintain a certain lower temperature for proper functioning and control. The network connection port 630 may accept any standard Ethernet and/or any other network cable to serve as a network connection from the control box 600 to another device. For example, a network cable leading from the network connection port 630 may be connected to other control boxes, a third party controller and/or other devices. In this way, more than one control box may be networked together to provide scalability of the lighting system and/or synchronization of any number of displays controlled by any number of control boxes. For example, as further illustrated in FIG. 6D, in at least one embodiment of the control box 600, the lighting controller may control up to sixteen channels. However, if networked, a control box may share timing and other data and information with another control box(es) to synchronize visual displays as separate components or displays and/or as part(s) a singular entire display.

FIG. 6D illustrates the right and left lateral views of the control box 600. The left lateral view depicts the control box 600 as having two latches to ensure proper closure of a lid or top of the control box 600. While latches are provided in the embodiment illustrated in FIG. 6D, any such enclosure means may be used to secure the lid of the enclosure in a closed position. The right lateral view of the control box 600 illustrates the channel ports 635. As illustrated in FIG. 6D, in at least one embodiment, the control box 600 contains sixteen channel ports. In at least one embodiment, the channel ports are three-pin female end receivers that accept a three-pin male end input. For example, the channel ports 635 may accept a three-pin male end connector of a light strand such as the exemplary lighting fixture apparatus 300 (FIG. 3). The control box 600 may be limited in the number of channel ports it may contain by any power requirements of the lighting controller and/or the lighting fixture apparatus, and/or any lights or LEDs associated with the lighting fixture(s). While the illustrated embodiment contains sixteen channel ports, the design illustrated is based on a total load capacity of lighting fixtures that may be connected to the control box 600. For example, the control box 600 is designed to control sixteen channels with each channel port allowing the connection of three light strands, with each light strand containing ninety-nine monochrome LEDs connected together in series for a maximum controlling capacity of 4,752 LEDs. In an alternative implementation of the control box 600, a maximum control of 1,600 RGB LEDs is achieved through connection of sixteen one-hundred-light RGB light strands, one strand connected to each channel port on the control box 600.

The light controllers, such as those illustrated in FIGS. 5A and 5B execute the light controller program code. The light controller program facilitates synchronization, data capture, counter control and light control of the lighting system. A light controller's internal clock may be synchronized with the incoming data bit stream. If an incoming data bit stream is detected and/or synchronized, it can be captured, processed and/or stored by the light controller. Utilizing program code, the light controller may utilize any data to control illumination of any lights on the light fixture apparatus. The process 700 of FIGS. 7A-7C illustrates the process of executing the light controller program code of the lighting system.

Figure 7A:
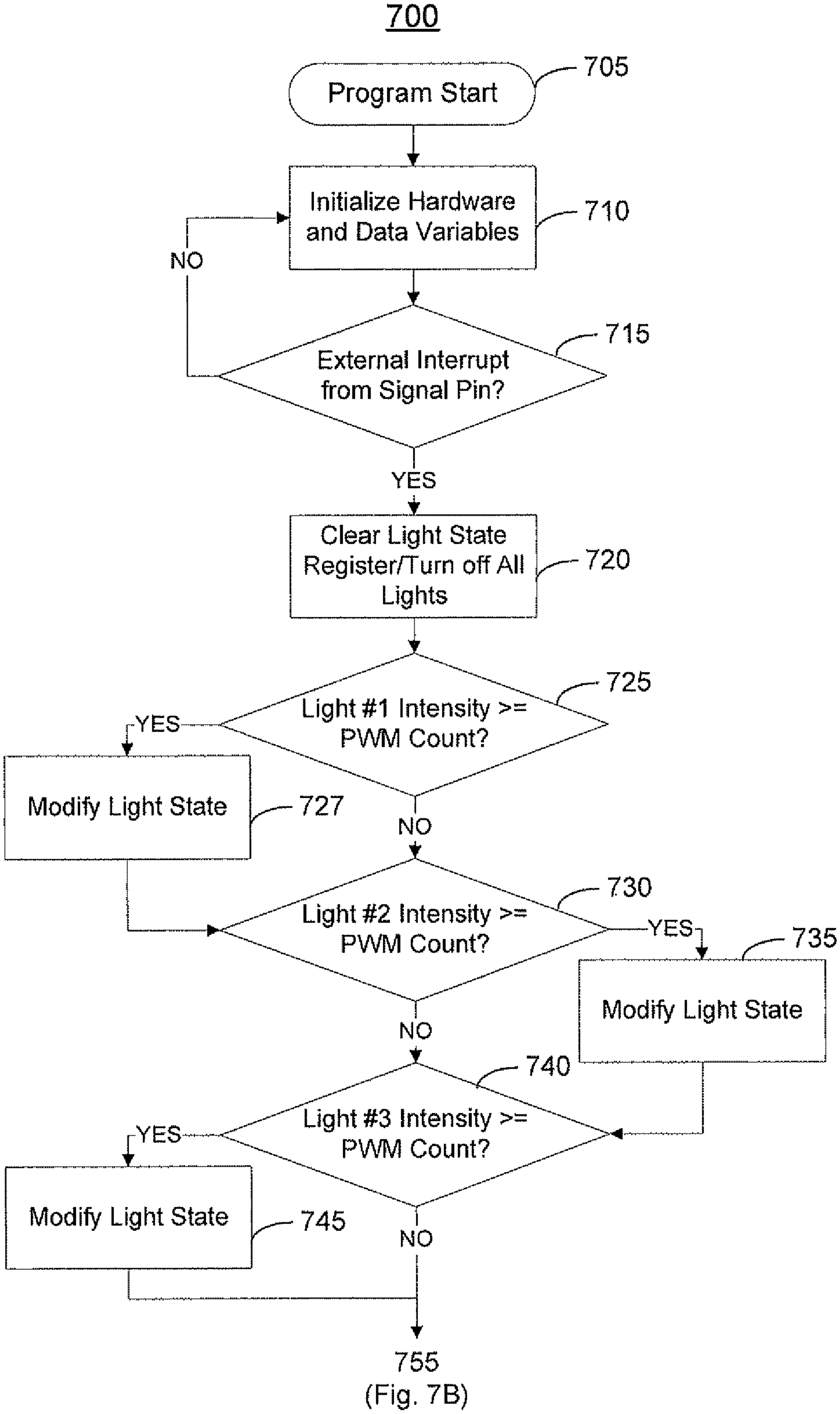
FIGS. 7A-7C illustrate a flow diagram of a system process.
Figure 7B:
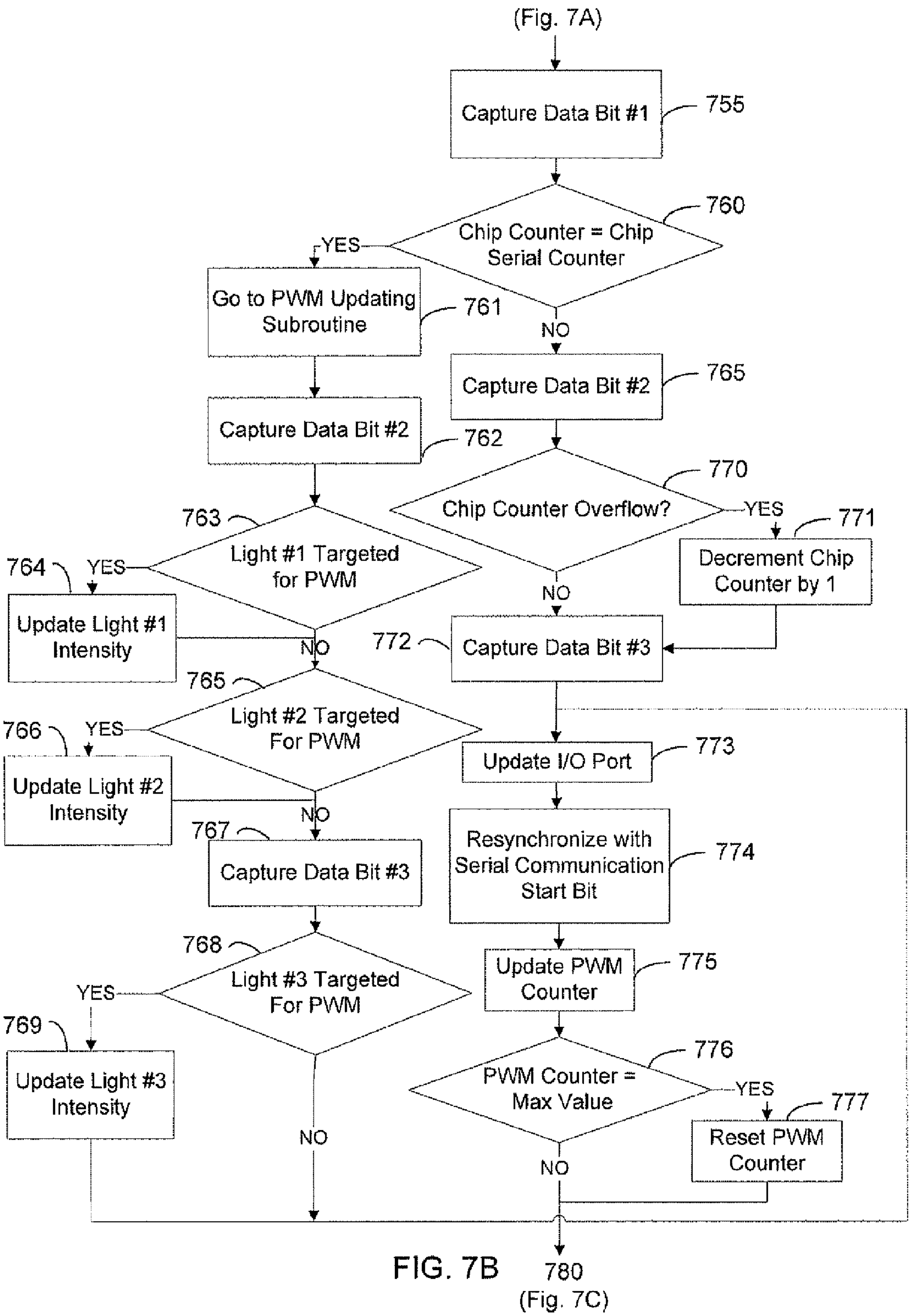
Figure 7C:
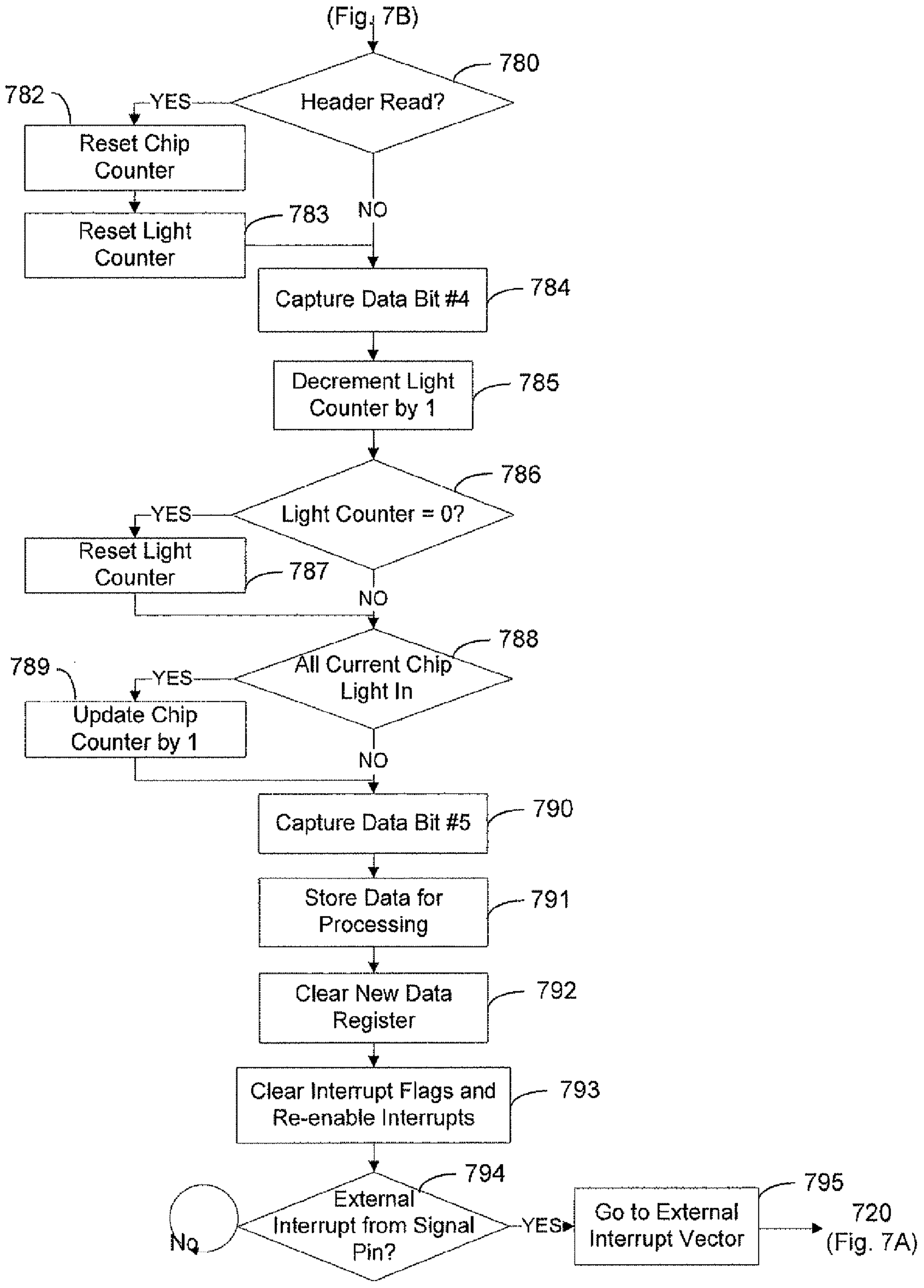

FIG. 7A illustrates the program code start of the light controller program code execution. In ate least one embodiment, data may be sent using a one-way asynchronous communication protocol utilizing 5-bit binary words. The light controller program length spans the time for a microcontroller to read a 5-bit word of data. In at least one embodiment, the word 0b11111 serves as a packet header containing addressing and other information. Data can be captured and stored for processing during a subsequent word transmission. A series of 5-bit PWM values can be sent to control the state of each light. In operation 705, the program code is executed. If operation 705 is complete, control is passed to operation 710 and process 700 continues In operation 710, hardware and data variables are detected. An external hardware interrupt can detect a low-high transition which corresponds to a stop-start bit transition. This detection may be utilized at the start of a data word transmission to enable the light controller program to start at the external interrupt vector's address. Utilizing the transition allows cycle losses associated with a relative jump to be avoided. The external interrupt may only be enabled at the end of the initialization of the light controller program for prevention of a data low-high from triggering the interrupt. If operation 710 is complete, control is passed to operation 715 and process 700 continues.

In operation 715, a determination is made as to whether an external interrupt is detected from a signal pin. If an external interrupt is detected, control is passed to operation 720 and process 700 continues. If an external interrupt is not detected, control is passed to operation 710 and process 700 continues.

In operation 720, a clearing of the state of all lights is performed by the light controller program code and all lights of the lighting fixture apparatus are set to the 'off' or unlit state or position. A light controller microcontroller may not be addressed by assigning a particular serial number. Alternatively, the microcontroller may count the number of PWM 'words' transmitted and/or update any lights the microcontroller controls when the PWM value(s) of the lights is received. If operation 720 is complete, control is passed to operation 725 and process 700 continues.

In operation 725, a determination is made as to whether the intensity or illumination of a first in a plurality of lights meets a certain threshold PWM value. If the certain threshold PWM value is met or exceeded, control is passed to operation 727 and process 700 continues. If the certain threshold PWM value is not met or exceeded, control is passed to operation 730 and process 700 continues. The determination of operation 725 may be made by comparing an individual PWM light value to a PWM system value. For example, in an exemplary light controller program code, a value of 'PWMCount' is defined as a PWM system value. In the above example, 'PWMCount' may be incremented in value by a numerical value of '1' if the program completes an entire cycle. The incremented value of 'PWMCount' may be cleared and/or reset if 'PWMCount' reaches a certain maximum value that may, for example, correspond to the number of microcontrollers resident in a lighting fixture apparatus.

In operation 727, a light state of a first in a plurality of lights is modified. If in operation 725, the detected PWM of a first light meets or exceeds a certain threshold value then in operation 727 the light is illuminated or turned on. If operation 727 is complete, control is passed to operation 730 and process 700 continues.

In operation 730, a determination is made as to whether the intensity or illumination of a second in a plurality of lights meets a certain threshold PWM value. If the certain threshold PWM value is met or exceeded, control is passed to operation 735 and process 700 continues. If the certain threshold PWM value is not met or exceeded, control is passed to operation 740 and process 700 continues. The determination of operation 730 may be made by comparing an individual PWM light value to a PWM system value. For example, in an exemplary light controller program code, a value of 'PWMCount' is defined as a PWM system value. In the above example, 'PWMCount' may be incremented in value by a value of '1' if the program completes an entire cycle. The incremented value of 'PWMCount' may be cleared and/or reset if 'PWMCount' reaches a certain maximum value that may correspond to the number of microcontrollers resident in a lighting fixture apparatus.

In operation 735 a light state of a second in a plurality of lights is modified. If in operation 730, the detected PWM value of a second light meets or exceeds a certain threshold value then in operation 735 the light is illuminated or turned on. If operation 735 is complete, control is passed to operation 740 and process 700 continues.

In operation 740, a determination is made as to whether the intensity or illumination of a third in a plurality of lights meets a certain threshold PWM value. If the certain threshold PWM value is met or exceeded, control is passed to operation 745 and process 700 continues. If the certain threshold PWM value is not met or exceeded, control is passed to operation 755 (FIG. 7B) and process 700 continues. The determination of operation 740 may be made by comparing an individual PWM light value to a PWM system value. For example, in an exemplary light controller program code, a value of an exemplary variable, such as 'PWMCount', is assigned as a PWM system value. In the above example, 'PWMCount' may be incremented in value by a value of '1' if the program completes an entire cycle. The incremented value of 'PWMCount' may be cleared and/or reset if 'PWMCount' reaches a certain maximum value that may correspond to the number of microcontrollers resident in a lighting fixture apparatus.

In operation 745 a light state of a third in a plurality of lights is modified. If in operation 740, the detected PWM value of a third light meets or exceeds a certain threshold value then in operation 745 the light is illuminated or turned on. If operation 745 is complete, control is passed to operation 755 (FIG. 7B) and process 700 continues.

In operation 755, a first of a plurality of data bits is captured. The data capture occurs through a series of lines of program code. The program code may contain a carry flag for data bit capture. Upon execution of the program code, the carry flag may be cleared to enable capture of a first data bit. In operation 755, a first data bit is captured and stored into the carry flag. To enable proper capture of data bits, program code may be placed in the center of each data bit as an MCU receiver clock of a light strand controller may drift high or low. If a data bit is captured in operation 755, the carry flag may be rotated into a new data variable which may be placed into a subsequent data variable for processing during a next program cycle. If operation 755 is complete, control is passed to operation 760 and process 700 continues.

In operation 760, a determination is made as to whether a microcontroller counter transmitted signal data value equals a value of a microcontroller serial number or unique identification. If in operation 760, the microcontroller transmitted signal data value equals the value of a microcontroller serial number, control is passed to operation 761 and process 700 continues. If in operation 760, the microcontroller transmitted signal data value does not equal the value of a microcontroller serial number, control is passed to operation 765 and process 700 continues.

The determination in operation 760 is made to detect whether data transmitted to a microcontroller is intended for the microcontroller. The determination of operation 760 may be based on any microcontroller counter and/or serial number counter values. For example, in the lighting controller program code, a variable such as ‘LEDCount’ may be defined to correspond to a targeted LED and a variable ‘ChipCount’ may be defined to correspond to a targeted microcontroller. The variable ‘LEDCount’ may be set to begin, for example, at the numerical value of ‘3’. The ‘LEDCount’ variable may be decremented by a value of ‘1’ if a program cycle is completed. In the above example, the value of ‘3’ is representative of the light strand embodiment of FIG. 3 in which three LEDs are controlled by each microcontroller or MCU. If ‘LEDCount’ is decremented by a value of ‘1’ until it reaches the value of ‘0’, the variable may be restored to an initial value of ‘3’ and/or the variable ‘ChipCount’ may be incremented by a value of ‘1’.

Using the above exemplary program code, in operation 760, the value of the variable of ‘ChipCount’ may be compared to the value of the variable(s) assigned to the serial number(s) to each microcontroller of the lighting fixture apparatus. For example, in at least one embodiment, a microcontroller is placed every third LED on a light strand of ninety-nine lights for a total of thirty-three microcontrollers per light strand. Using the above example, each of the thirty-three microcontrollers may be assigned or may have a serial number or other unique identification detected and defined as a variable, such as the variable ‘SerialNum’. In operation 760, the value of the variable ‘SerialNum’ may be compared to the value of the variable ‘ChipCount’ to determine if the data transmitted to the microcontroller is intended for that microcontroller.

In operation 761, a PWM updating subroutine is executed by the lighting controller program code. If operation 761 is complete, control is passed to operation 762 and process 700 continues.

In operation 762, a second of a plurality of data bits is captured. The data capture occurs through a series of lines of program code operating under the initializing of the PWM updating subroutine. The program code may contain a carry flag for data bit capture. In operation 762 a second data bit is captured and stored into the carry flag. To enable proper capture of data bits, program code may be placed in the center of each data bit as an MCU receiver clock of a light strand controller may drift high or low. If a data bit is captured in operation 762, the carry flag may be rotated into a new data variable which may be placed into a subsequent data variable for processing during a next program cycle. If operation 762 is complete, control is passed to operation 763 and process 700 continues.

If in operation 760 a microcontroller transmitted signal data value equals the value of a microcontroller serial number or unique identification, the updating subroutine of operation 761 is bypassed and control is passed to operation 765.

If the targeted microcontroller is not determined in operation 760, operation 765 and process 700 continues to capture data bits without execution of the PWM updating subroutine. In operation 765, a second of a plurality of data bits is captured. The data capture occurs through a series of lines of the main program code. The program code may contain a carry flag for data bit capture. In operation 765 a second data bit is captured and stored into the carry flag. To enable proper capture of data bits, program code may be placed in the center of each data bit as an MCU receiver clock of a light strand controller may drift high or low. If a data bit is captured in operation 765, the carry flag may be rotated into a new data variable which may be placed into a subsequent data variable for processing during a next program cycle. If operation 765 is complete, control is passed to operation 770 and process 700 continues.

In operation 770, a determination is made as to whether the targeted microcontroller value has reached or exceeded a threshold value. For example, in operation 770, the targeted microcontroller value, continuing to be defined as the exemplary program code variable ‘ChipCount’, may be compared to a threshold value. If the microcontroller counter variable ‘ChipCount’ reaches or exceeds a threshold value, then the microcontroller counter may overflow. The overflow may be a result of a packet header data value failing to be transmitted and/or skipped or missed. In order to prevent the microcontroller counter from overflowing, the determination of operation 770 is made by the lighting controller program code. If the microcontroller value has reached a threshold value, control is passed to operation 771 and process 700 continues. If the microcontroller value has not reached or exceeded a threshold value, control is passed to operation 772 and process 700 continues.

In operation 771, the microcontroller counter value is decremented. For example, using the exemplary variable ‘ChipCount’, the value of ‘ChipCount’ may be decremented by a value of ‘1’ to return the ‘ChipCount’ value to a value below the defined threshold value. If operation 771 is complete, control is passed to operation 772 and process 700 continues.

If the targeted microcontroller is determined in operation 760, operation 761 executes the PWM updating subroutine, process 700 continues to capture data bits, and a determination is made for targeting lights. In operation 763, a determination is made as to whether a first of a plurality of lights is targeted for PWM. If it is determined that a first of a plurality of lights is targeted for PWM, control is passed to operation 764 and process 700 continues. If it is determined that a first of a plurality of lights is not targeted for PWM, control is passed to operation 765 and process 700 continues.

In operation 764 the light state of a first of a plurality of lights is modified. For example, if in operation 763, it is determined that light ‘one’ is targeted by a transmitted stream of data, then by PWM the light intensity or luminance is updated in response to the incoming stream of data. The light luminance modification or update may include turning a light or LED 'on', turning a light or LED 'off', changing a light or LED color, effect, intensity, or any other manipulation allowable by the light controller or MCU.

In operation 765, a determination is made as to whether a second of a plurality of lights is targeted for PWM. If it is determined that a second of a plurality of lights is targeted for PWM, control is passed to operation 766 and process 700 continues. If it is determined that a second of a plurality of lights is not targeted for PWM, control is passed to operation 767 and process 700 continues.

In operation 766 the light state of a second of a plurality of lights is modified. For example, if in operation 765, it is determined that light 'two' is targeted by a transmitted stream of data, then by PWM the light intensity or luminance is updated in response to the incoming stream of data. The light luminance modification or update may include turning a light or LED 'on', turning a light or LED 'off', changing a light or LED color, effect, intensity, or any other manipulation allowable by the light controller or MCU.

In operation 767, a third of a plurality of data bits is captured. The data capture occurs through a series of lines of program code operating under the branch of the program code initializing the PWM updating subroutine. The program code may contain a carry flag for data bit capture. In operation 767, a third data bit is captured and stored into the carry flag. To enable proper capture of data bits, program code may be placed in the center of each data bit as an MCU receiver clock of a light strand controller may drift high or low. If a data bit is captured in operation 767, the carry flag may be rotated into a new data variable which may be placed into a subsequent data variable for processing during a next program cycle. If operation 767 is complete, control is passed to operation 768 and process 700 continues.

In operation 768, a determination is made as to whether a third of a plurality of lights is targeted for PWM. If it is determined that a third of a plurality of lights is targeted for PWM, control is passed to operation 769 and process 700 continues. If it is determined that a third of a plurality of lights is not targeted for PWM, control is passed to operation 773 and process 700 continues.

In operation 769, the light state of a third of a plurality of lights is modified. For example, if in operation 769, it is determined that light 'three' is targeted by a transmitted stream of data, then by PWM the light intensity or luminance is updated in response to the incoming stream of data. The light luminance modification or update may include turning a light or LED 'on', turning a light or LED 'off', changing a light or LED color, effect, intensity, or any other manipulation allowable by the light controller or MCU.

In operation 772 a third of a plurality of data bits is captured. The data capture of operation 772 occurs through a series of lines of program code operating under the branch of the main program bypassing the PWM updating subroutine. The program code may contain a carry flag for data bit capture. In operation 772 a third data bit is captured and stored into the carry flag. To enable proper capture of data bits, program code may be placed in the center of each data bit as an MCU receiver clock of a light strand controller may drift high or low. If a data bit is captured in operation 772, the carry flag may be rotated into a new data variable which may be placed into a subsequent data variable for processing during a next program cycle. If operation 772 is complete, control is passed to operation 773 and process 700 continues.

In operation 773, any I/O ports of the microcontroller of the light controller are updated. If operation 773 is complete, control is passed to operation 774 and process 700 continues.

In operation 774, a second synchronization occurs by polling the data line value in the serial communications start bit. If operation 774 is complete, control is passed to operation 775 and process 700 continues.

In operation 775, the value of the PWM counter of the microcontroller is updated. For example, using the exemplary light controller program code, a value of an exemplary variable, such as 'PWMCount', is assigned as a PWM system counter value. In the above example, 'PWMCount' may be updated by incremented in value by a value of '1' if the program code completes an entire cycle. If operation 775 is complete, control is passed to operation 776 and process 700 continues.

In operation 776, a determination is made as to whether the PWM counter has met or exceeded a certain threshold value. If it is determined that a PWM counter has met or exceeded a certain threshold value, control is passed to operation 777 and process 700 continues. If it is determined that a PWM counter has not met or exceeded a certain threshold value, control is passed to operation 780 (FIG. 7C) and process 700 continues. The determination in operation 776 may be facilitated by a simple comparison of program code values. For example, using the exemplary light controller program code, a value of an exemplary variable, such as 'PWMCount', is assigned as a PWM system counter value. In the above example, 'PWMCount' may be compared against a maximum threshold numerical value to determine if the PWM counter has met or exceeded a maximum value.

In operation 777, the incremented value of the PWM counter may be reset or cleared. For example, using the exemplary light controller program code, the variable 'PWMCount' may be cleared and/or reset if 'PWMCount' reaches a certain maximum value that may correspond to the number of microcontrollers resident in a lighting fixture apparatus.

In operation 780, a determination is made as to whether header data is read by the lighting controller. If it is determined that header data is read by the lighting controller, control is passed to operation 782 and process 700 continues. If it is determined that header data is not read by the lighting controller, control is passed to operation 784 and process 700 continues.

In operation 782, a microcontroller counter is reset or cleared. For example, using the exemplary light controller program code with the variable 'ChipCount', the value of 'ChipCount' may be reset to a numeric value of '0' to clear the 'ChipCount' value. If operation 782 is complete, control is passed to operation 783 and process 700 continues.

In operation 783, a light or LED counter is reset or cleared. For example, in the lighting controller program code, a variable such as 'LEDCount' may be defined to correspond to a targeted LED and a variable. Using the exemplary light controller program code with the variable 'LEDCount', the value of 'LEDCount' may be reset to a numeric value of '0' to clear the 'LEDCount' value. If operation 783 is complete, control is passed to operation 784 and process 700 continues.

In operation 784, a fourth of a plurality of data bits is captured. The data capture of operation 784 occurs through a series of lines of program code operating under the branch of the main program code. The program code may contain a carry flag for data bit capture. In operation 784, a fourth data bit is captured and stored into the carry flag. To enable proper capture of data bits, program code may be placed in the center of each data bit as an MCU receiver clock of a light strand controller may drift high or low. If a data bit is captured in operation 784, the carry flag may be rotated into a new data variable which may be placed into a subsequent data variable for processing during a next program cycle. If operation 784 is complete, control is passed to operation 785 and process 700 continues.

In operation 785, a light counter is decremented. For example, in the lighting controller program code, a variable such as 'LEDCount' may be defined to correspond to a targeted LED. The variable 'LEDCount' may be set to begin at the value of '3'. Using the above example, in operation 785, the 'LEDCount' variable may be decremented by a numeric value of '1'. If operation 785 is complete, control is passed to operation 786 and process 700 continues.

In operation 786, a determination is made as to whether a light or LED counter value equals the numeric value of '0'. Using the exemplary light controller program code with the variable 'LEDCount', the value of 'LEDCount' may be decremented by a value of '1' after a data bit capture until 'LEDCount' reaches the value of '0'. If it is determined that the LED counter value reaches the numeric value of '0', control is passed to operation 787 and process 700 continues. If it is determined that the LED counter value has not reached the numeric value of '0', control is passed to operation 788 and process 700 continues.

In operation 787, a light counter is decremented. For example, in the lighting controller program code, a variable such as 'LEDCount' may be defined to correspond to a targeted LED. Using the above example, in operation 787, the 'LEDCount' variable may be decremented by a numeric value of '1' If operation 787 is complete, control is passed to operation 788 and process 700 continues.

In operation 788, a determination is made as to whether a microcontroller has accounted for all lights or LEDs associated with the microcontroller. If it is determined that the microcontroller has accounted for all light or LEDs associated with the microcontroller, control is passed to operation 789 and process 700 continues. If it is determined that the microcontroller has not accounted for all lights or LEDs associated with the microcontroller, control is passed to operation 790 and process 700 continues.

In operation 789, the microcontroller counter value is decremented. For example, using the exemplary variable 'ChipCount', the value of 'ChipCount' may be incremented by a value of '1'. If operation 789 is complete, control is passed to operation 790 and process 700 continues.

In operation 790, a fifth of a plurality of data bits is captured. The data capture of operation 790 occurs through a series of lines of program code operating under the branch of the main program code. The program code may contain a carry flag for data bit capture. In operation 790, a fifth data bit is captured and stored into the carry flag. To enable proper capture of data bits, program code may be placed in the center of each data bit as an MCU receiver clock of a light strand controller may drift high or low. If a data bit is captured in operation 790, the carry flag may be rotated into a new data variable which may be placed into a subsequent data variable for processing during a next program cycle. If operation 790 is complete, control is passed to operation 791 and process 700 continues.

In operation 791, data is stored for processing. If operation 791 is complete, control is passed to operation 792 and process 700 continues.

In operation 792, a data register of received data is cleared. If operation 792 is complete, control is passed to operation 793 and process 700 continues.

In operation 793, any external hardware interrupt flags created by the lighting controller program code may be cleared and re-enabled for program restart. If operation 793 is complete, control is passed to operation 794 and process 700 continues.

In operation 794, a determination is made as to whether an external interrupt is detected from a signal pin. An external interrupt can detect a low-high transition which corresponds to a stop-start bit transition. If an external interrupt is detected, control is passed to operation 795 and process 700 continues. If an external interrupt is not detected, control remains at operation 794 and process 700 continues.

In operation 795, the external interrupt detection is utilized at the start of a data word transmission to enable the light controller program to navigate to the external interrupt vector address. If operation 795 is complete, control is passed to operation 720 (FIG. 7A) and process 700 continues.

Figure 8:
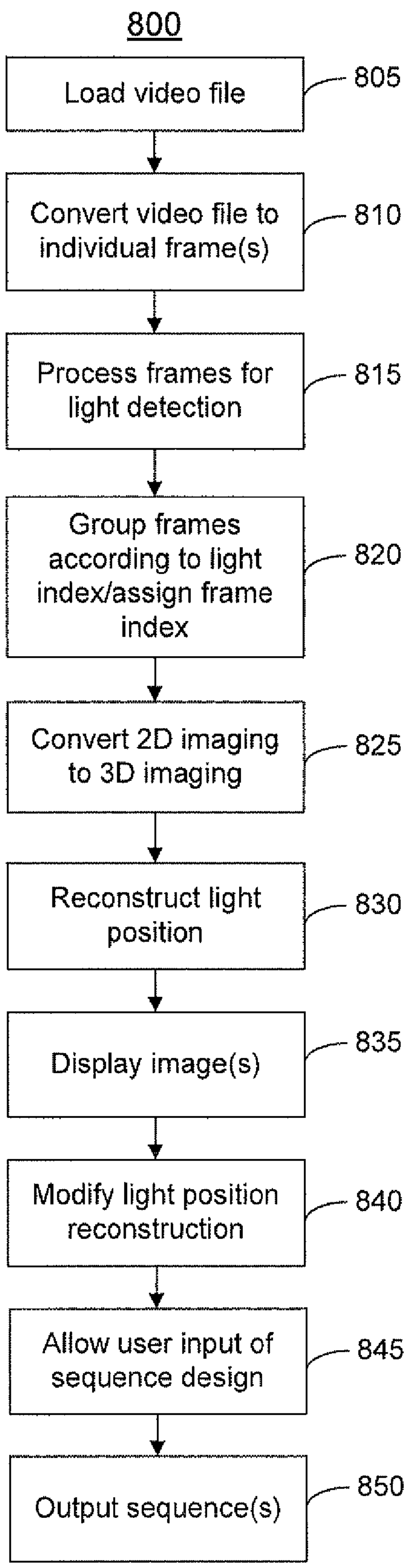
FIG. 8 illustrates a flow diagram of software program code logic.

FIG. 8 illustrates a flowchart depicting the overall logic structure 800 of the computer software associated with the lighting system 105 (FIG. 1). As previously discussed according to the system process 200 (FIG. 2), computer readable medium, embodied as computer software, may include a file conversion program, a software program to read, analyze, process and/or manipulate visual information or data, an interface(s) for user selection of display information, and other data and/or information used in facilitating the output display information that may be transferred to the light controller.

In operation 805, video or other visual or other information obtained during a recording process of the lighting apparatus is loaded into a software program. Visual information may be loaded into the software program by, for example, utilizing a GUI such as the GUI 900 illustrated in FIG. 9. If operation 805 is complete, control is passed to operation 810 and process 800 continues.

In operation 810, a video or any other portion of visual information is converted into individual frames. In at least one embodiment of the lighting system 105 (FIG. 1), a software package is provided that may include a file conversion program, such as any commonly available open-source video conversion utility capable of converting the visual information obtained via a recording device to any desired file format. For example, the original visual information transferred to the software program in operation 805 may be converted to a compressed AVI file format via the file conversion program. The file format of the converted visual information may be any format that can allow individual frames of visual information to be extracted from the entire file. Extraction of individual frames may be facilitated by using any software application programming interface, or any other software and/or codec capable of extracting individual frames. If operation 810 is complete, control is passed to operation 815 and process 815 continues.

In operation 815, the software program may read the converted visual information, and process and/or analyze any images or frames of such visual information for determining light detection. For example, the software program may read a first frame of the converted visual information, and thus be capable of detecting any metadata, for example, any dimensions of the visual information, such as frame dimensions of a video frame, any codec and/or software used to convert and/or compress the visual information, information associated with the recording device, such as frame rate, etc., and/or any other information, parameters and/or data available. Alternatively, a user may be able to define any parameters associated with visual information. For example, a user may be presented with a parameter interface, such as the GUI 1000 (FIG. 10), in which a user may be able to define frame dimensions, pre-determined or pre-defined light position(s), lighting apparatus quantity, type, size, shape, etc., and/or any other data or information that may be used in defining an exemplary light image or map of the lighting fixture apparatus and associated lights. If operation 815 is complete, control is passed to operation 820 and process 800 continues.

In operation 820, any frames associated with the visual frame information may be read, processed, analyzed, compared and/or grouped according to an index of light detection. A first frame of the converted visual information may be obtained by bypassing a portion of the visual information. For example, if a sequencing event is initiated, such as the calibration sequencing event of the lighting apparatus discussed in operation 220 of process 200 (FIG. 2), a 'flashing' of all lights associated with the lighting fixture(s) may be performed to indicate that the sequencing event has commenced, and such a 'flashing' of all associated lights may be bypassed as any initial 'flashing' of lights may, for example, interfere with the software program reading, analysis and/or processing of the visual information. A bypassing of a portion of visual information may be based on a time period, a frame set, or any other measurement.

The processing of operation 820 may be done on an individual frame basis. An analysis of the visual information may include locating or detecting a first frame where a percentage and/or threshold value of all lights of a frame of visual information associated with a lighting fixture are illuminated, locating subsequent frame(s) in which a percentage or threshold, which may be based on a first frame reading of all lights associated with the lighting fixture are illuminated, and/or any other analysis of the visual information. In performing an analysis on light illumination of the visual information, the program may initially set a threshold value for light illumination. Alternatively, a user may be provided with an interface, such as the GUI 1000 (FIG. 10), in which a user may be able to define an initial pixel intensity threshold value which may be a numeric value. A threshold value may be a certain percentage associated with a total.

The analysis of operation 820 may be based on any component level(s). For example, a pixel, or any other measurement of the visual information may be analyzed to determine illumination of a light. A pixel may be considered a possibility for illumination of a light if any, or all component level values of a pixel reach a certain threshold. For example, if a red, a green, and/or a blue component associated with a pixel meets, and/or exceeds a certain threshold value, the pixel may be considered an illuminated pixel associated with an illuminated light. The information obtained from analysis of an individual pixel(s) of the visual information may be utilized in determining and/or assigning an overall illumination value or index of a frame.

The comparing or grouping of operation 820 may be based on a threshold value(s) and/or an average multiplier, etc. The software program may define or determine an average multiplier and/or threshold value(s) to be utilized in determining an average or representative frame of the lighting fixture apparatus. Alternatively, a user may be provided with an interface, such as the GUI 1000 (FIG. 10), in which a user may be able to define a pixel difference threshold value and/or pixel average multiplier, etc. An average frame may be utilized in comparing or grouping frame(s). For example, analysis of all frames associated with the visual information may yield individual values that may be totaled and averaged into a representative frame of visual information considered a frame of visual information with all lights associated with the lighting fixture apparatus illuminated.

The software program may continue through operation 820 until all frames associated with the visual information are read, analyzed, and compared. Alternatively, in at least one embodiment, a representation of light positioning may be produced manually or by a coupling of automatic detection utilizing the software code and manual inclusion of light positions using a matrix or sectional system. For example, if the lighting fixture(s) is distributed in a grid format or other pre-defined and/or uniform positioning, then an axis positioning of lights may be produced by utilizing a graphing or matrix program. Whether obtained automatically, manually, and/or by a combination of both methods, the representative frame or image or light map of visual information is utilized in determining the positioning of the lights associated with the lighting fixture(s). If operation 820 is complete, control is passed to operation 825 and process 800 continues.

In operation 825, the resulting image or light map created in operation 820 may be converted from a 2D image to a 3D representation. The 2D positioning information obtained in operation 820 may be used to create a set of coordinates, a histogram, and/or any other textual, pictorial, graphical, or any other type of representation of the information. The 2D representation of light illumination information may be any set of coordinates, such as axes coordinates, for example, Cartesian coordinates utilizing an x-axis and a y-axis. The 2D coordinates of each light position of the representative image or light map may in turn be utilized in rendering a 3D image based on an image based rendering algorithm. For example, a lighting apparatus with identification (ID) tags or labels associated with each light may be distributed as desired. The tags or label IDs of a plurality of lights representative of a 3D space may be determined and/or input into the software program. For example, lighting fixture apparatus may be distributed on a three-dimensional object, such as a tree, and ID tags of a sampling of lights from a top four corners and a bottom four corners may be determined and input as coordinates or otherwise into the software program. The program may use the ID tags or coordinates to render a 3D image.

Alternatively, sensors, such as infrared, radio frequency and/or other devices may be installed in or applied to any lights associated with a lighting fixture apparatus. For example, an infrared sensor may be installed on each LED of an exemplary light strand such as the light strand 300 (FIG. 3). An infrared sensor(s) associated with a first light or LED may detect an infrared sensor(s) associated with a second light and thus detection of a relative position(s) of any lights associated with a lighting apparatus may be obtained. The relative position(s) may be input into the software program to render a 3D positioning or image of the lights associated with the lighting fixture apparatus.

Another alternative to obtain a 3D image is by utilizing spatial positioning of a recording device. For example, during a recording of a calibration sequence, such as in operation 220 of process 200 (FIG. 2), a camera or other recording device may be placed at a pre-determined or fixed position(s) relative to the lighting fixture apparatus. A camera may be placed at a fixed distance(s) relative to a known orientation of a location (s) or object(s) displaying the lighting fixture apparatus. The position of any lights visible to the camera may be determined by utilizing the known positioning of the camera. For example, angles and/or distances may be calculated based on physical measurements taken of a fixed spatial position of a camera relative to a fixed position of a light(s). A plurality of cameras and/or fixed camera positions may be utilized. For example, in at least one embodiment, three cameras set at three separate fixed positions may record a calibration sequence of any lights associated with a lighting fixture apparatus. Using the above example, the position(s) of the lights associated with the lighting fixture apparatus may be calculated from the three fixed camera positions and the three camera angles.

Another alternative of 3D image rendering utilizes calculations based on matrices and linear equations. For example, the spatial position and orientation of a recording device may be represented by six variables. Using the above example, the variables ($x_n$, $y_n$, $z_n$) may represent the position of a camera in space, the variables ($r_n$, $r_n$, $r_n$) may represent the orientation of the camera, and the variables ($x_m$, $y_m$, $z_m$) may represent the position of individual lights. In the example, the variable 'n' is the number of cameras or camera positions and the variable 'm' is the number of lights associated with the lighting fixture apparatus. The exemplary variables can translate into parameters which may be input into matrix form for solving a system of linear equations. Utilizing reference points and distance(s) between these reference points, for example, by comparing these known 3D position(s) or coordinates to relative 2D image(s), the software program may calculate or create a system of linear equations. The software program may use the matrix parameters to solve the linear equations thus determining a 3D positioning of any lights. If operation 825 is complete, control is passed to operation 830 and process 800 continues.

Figure 13:
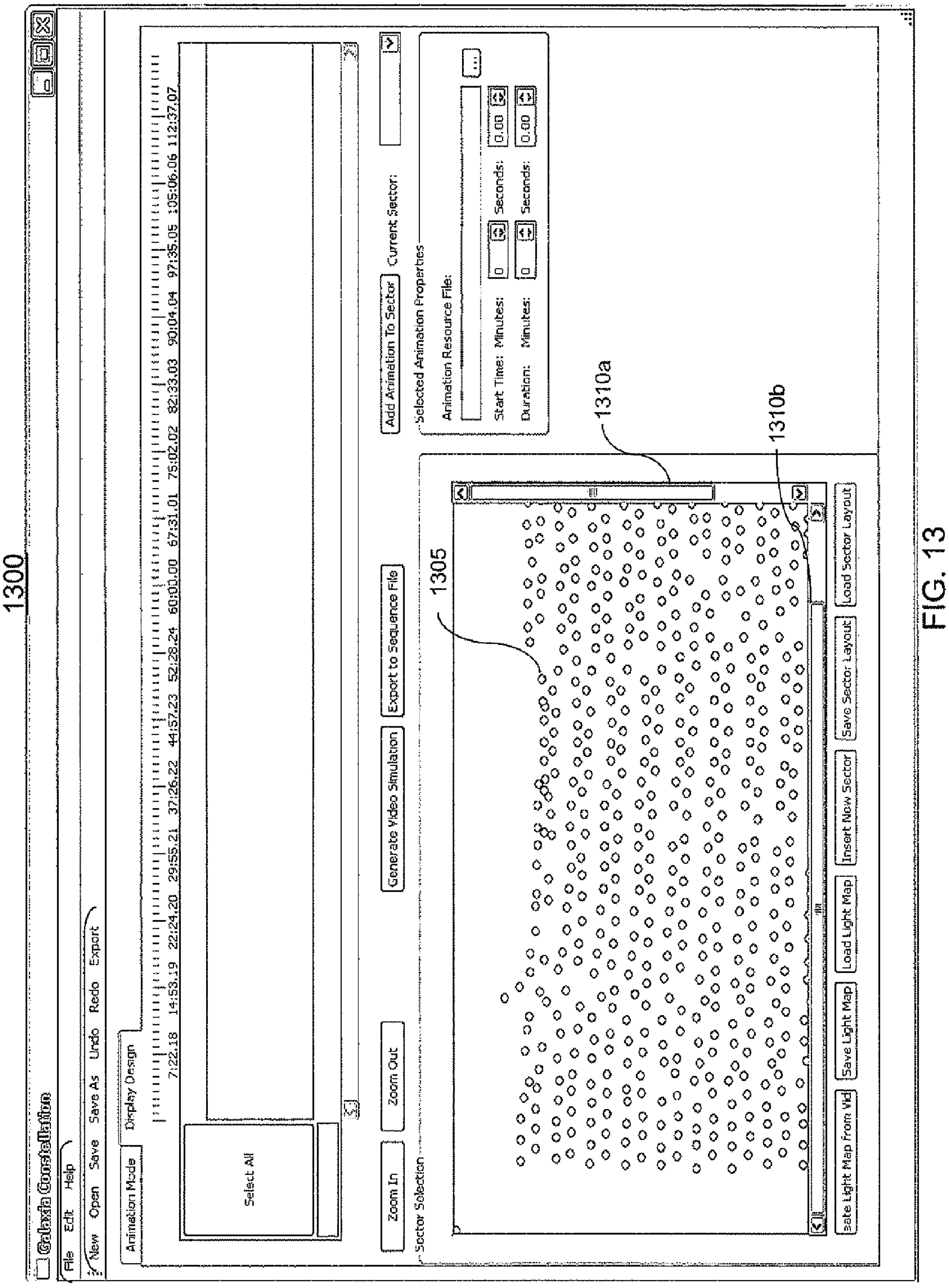
FIG. 13 illustrates a GUI.
Figure 14:
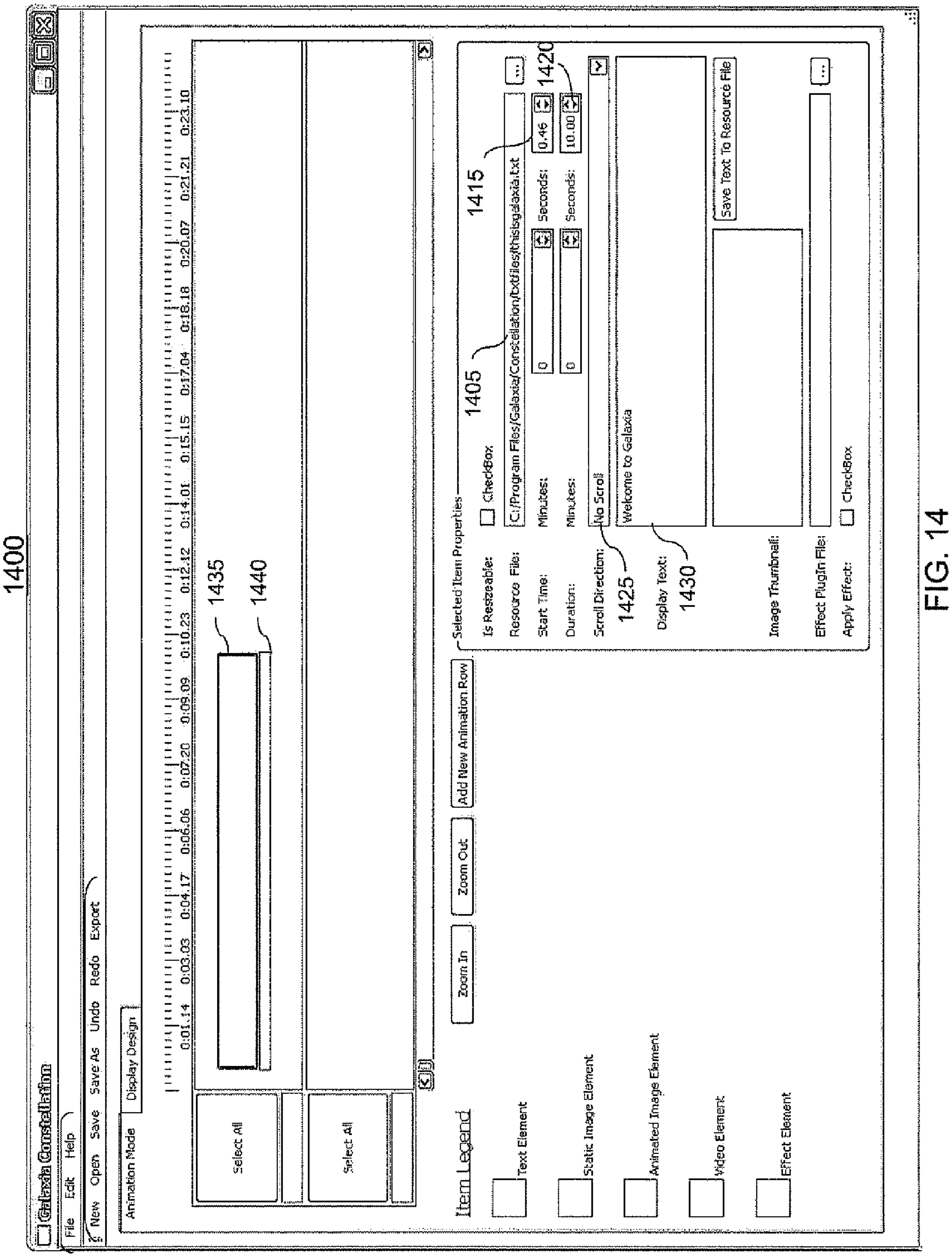
FIG. 14 illustrates a GUI.
Figure 15:
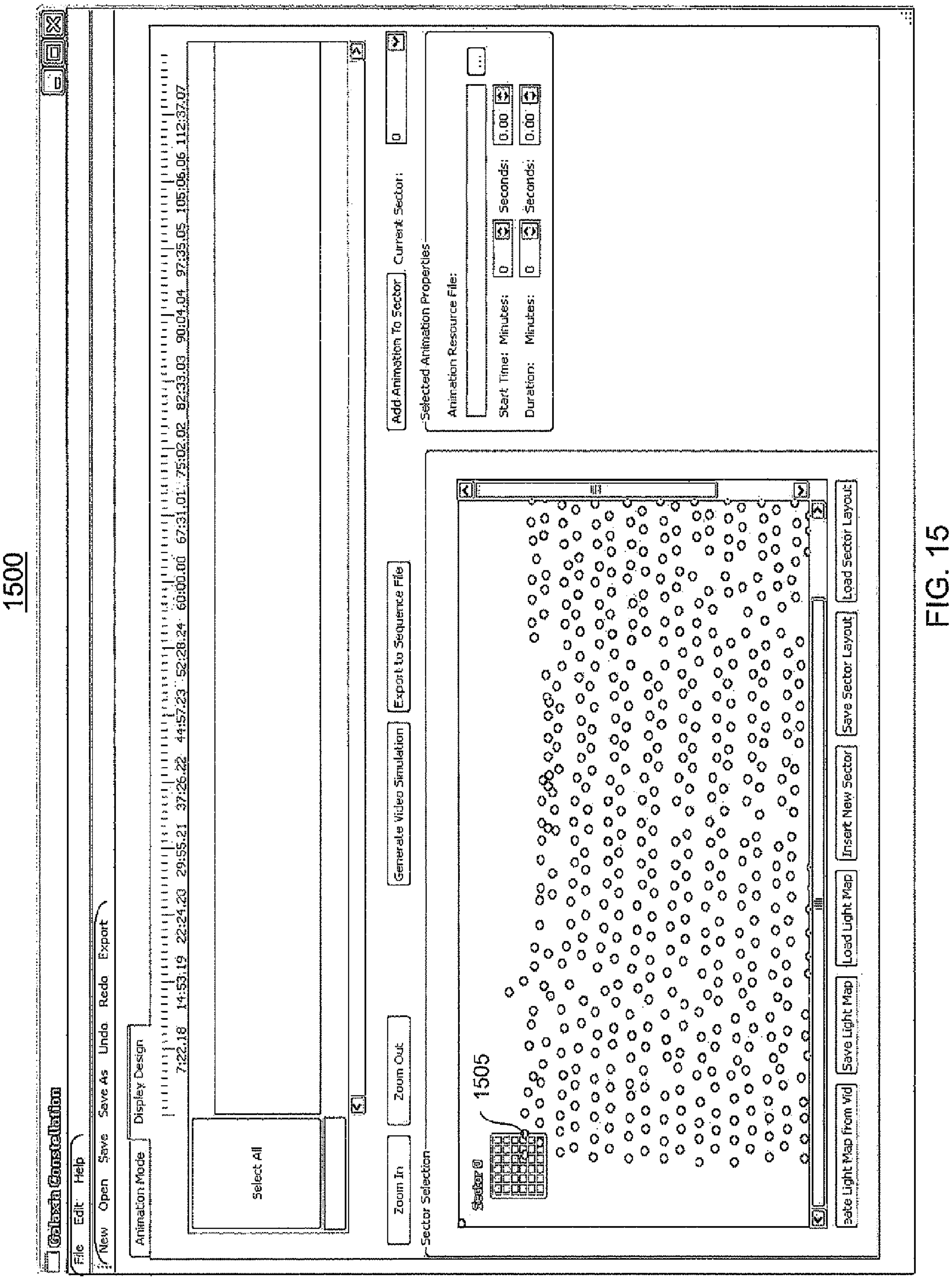
FIG. 15 illustrates a GUI.
Figure 16:
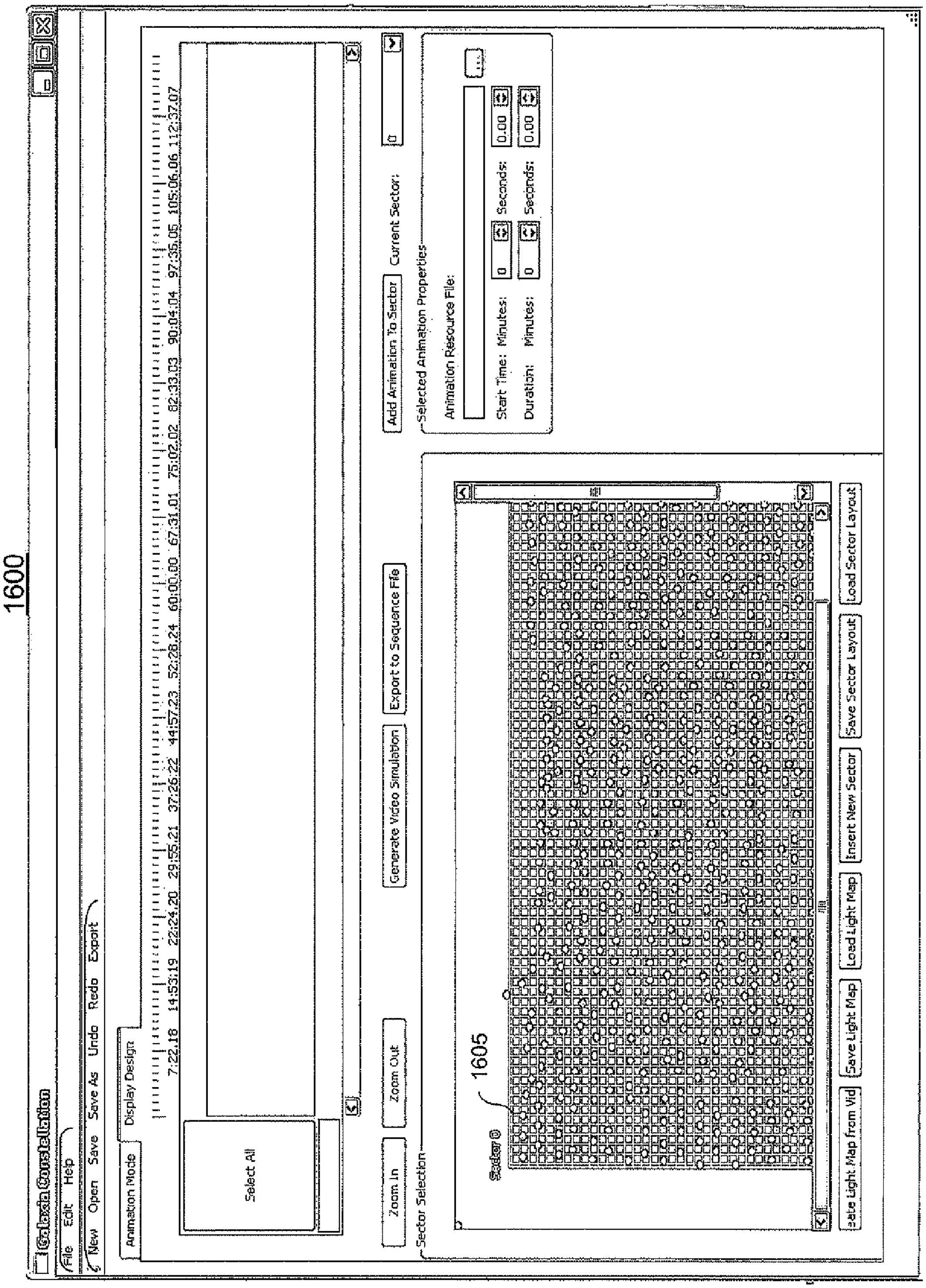
FIG. 16 illustrates a GUI.
Figure 17:
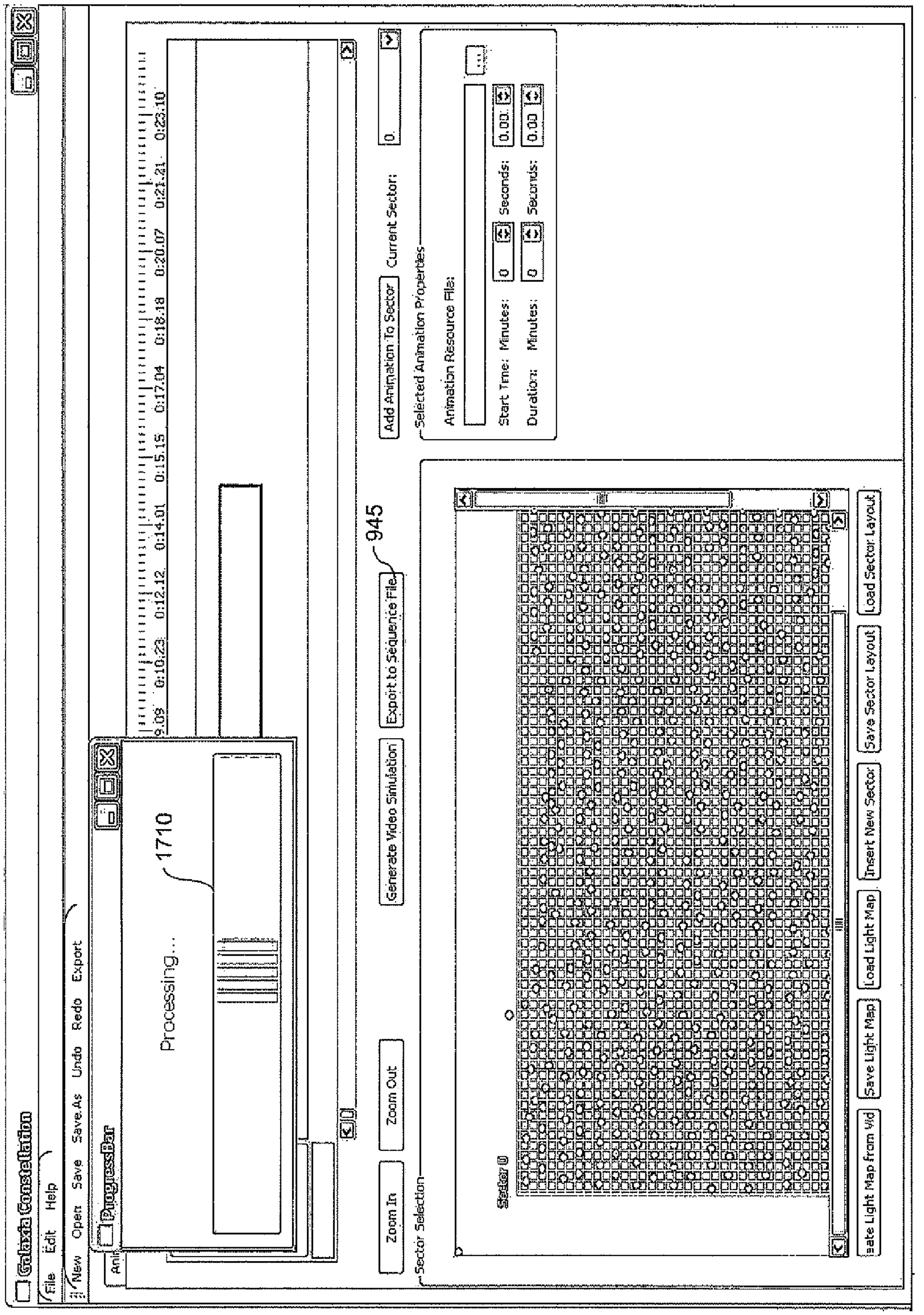
FIG. 17 illustrates a GUI.

In operation 830, the 2D or 3D light positioning determined in operation 825 is utilized by the software program to create or construct an image or light map. An exemplary light map 1305 is shown in GUI 1300 (FIG. 13). If operation 830 is complete, control is passed to operation 835 and process 800 continues.

In operation 835, an image or light map is displayed to a user. The image displayed may be represented by light and/or dark areas. For example, the representative light map 1305 (FIG. 13) is shown to contain light circles representing lights or LEDs that have had their positions detected by the software program and a dark background representing unlit areas. The image displayed to a user may be a 2D or 3D representation depending on which method of image rendering was utilized in operation 825. If operation 835 is complete, control is passed to operation 840 and process 800 continues.

In operation 840, the image reconstruction resulting from operation 835 may be modified. A representation of light positioning may be produced manually utilizing the software and/or any manual or user defined inclusion of light positions using matrices and/or a coordinate or sectional system may be utilized. For example, if a lighting fixture(s) is distributed in a grid format or other pre-defined and/or uniform positioning, then coordinates representing a positioning of lights may be produced by utilizing a graphing or matrix algorithm of the software program. If operation 840 is complete, control is passed to operation 845 and process 800 continues.

In operation 845, a user is provided with the ability to select and/or design a sequence or display information. For example, the software program may include a front end as illustrated by the GUIs of FIGS. 9-17. The software program may provide a user with the ability to design display features, graphics, animations, and/or any other static and/or visual information that may be included in a display and/or other visual program utilizing any lights associated with the light fixture(s). A user may be provided with selections or selectable options, and/or provided with the ability to design his or her own display or program based on any given display features. If operation 845 is complete, control is passed to operation 850 and process 800 continues.

In operation 850, any sequence or display information designed and/or selected in operation 845 is processed by the software program to enable output to the lighting controller. The program may process information into any file format that may be compatible with a lighting controller. If operation 850 is complete, process 800 completes if a user completes his or her utilization of the software program.

Figure 9:
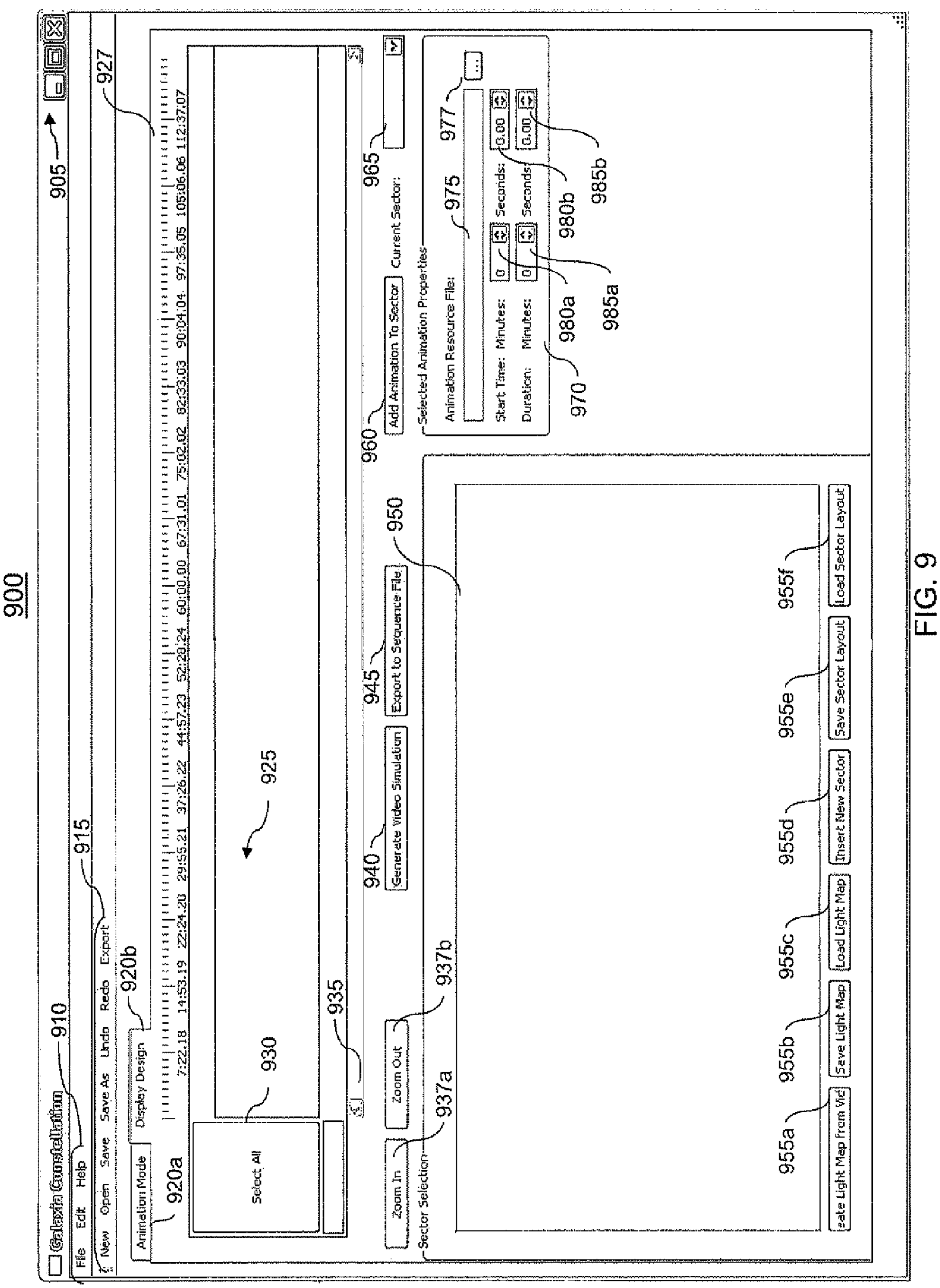
FIG. 9 illustrates a graphical user interface (GUI).

FIG. 9 illustrates an exemplary GUI 900 which may be presented to a user upon initiation of the software program associated with the lighting system 105 (FIG. 1). The GUI 900 includes window controls 905, main menu controls 910, submenu controls 915, tabs 920, display bar 925, time scale bar 927, selection control 930, display bar control 935, zoom controls 937, video simulation control 940, export control 945, sector window 950, user controls 955, animation addition control 960, sector selection control 965, animation property window 970, animation selection text box 975, animation selection browse control 977, initiation time controls 980, and duration time controls 985.

The window controls 905 may include any commonly known GUI window controls such as a close, minimize, and/or restore or maximize control. The main menu controls 910 may include menu headers associated with the software program. For example, as illustrated in FIG. 9, the main menu controls 910 include a 'File', an 'Edit' and a 'Help' selectable menu headers. The submenu controls 915 may include additional selectable menu headers that may be used to navigate through portions of the software program.

Figure 10:
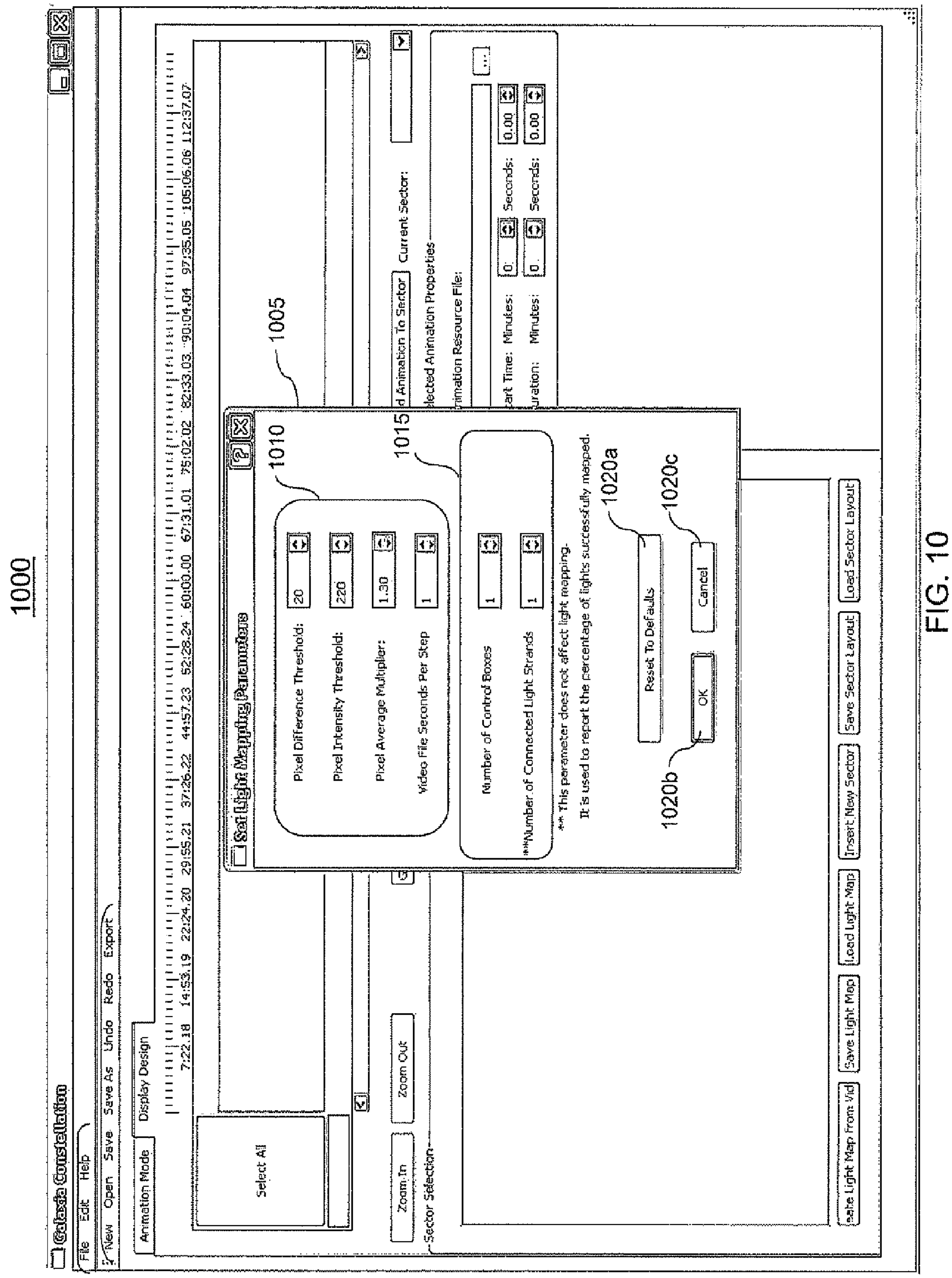
FIG. 10 illustrates a GUI.
Figure 11:
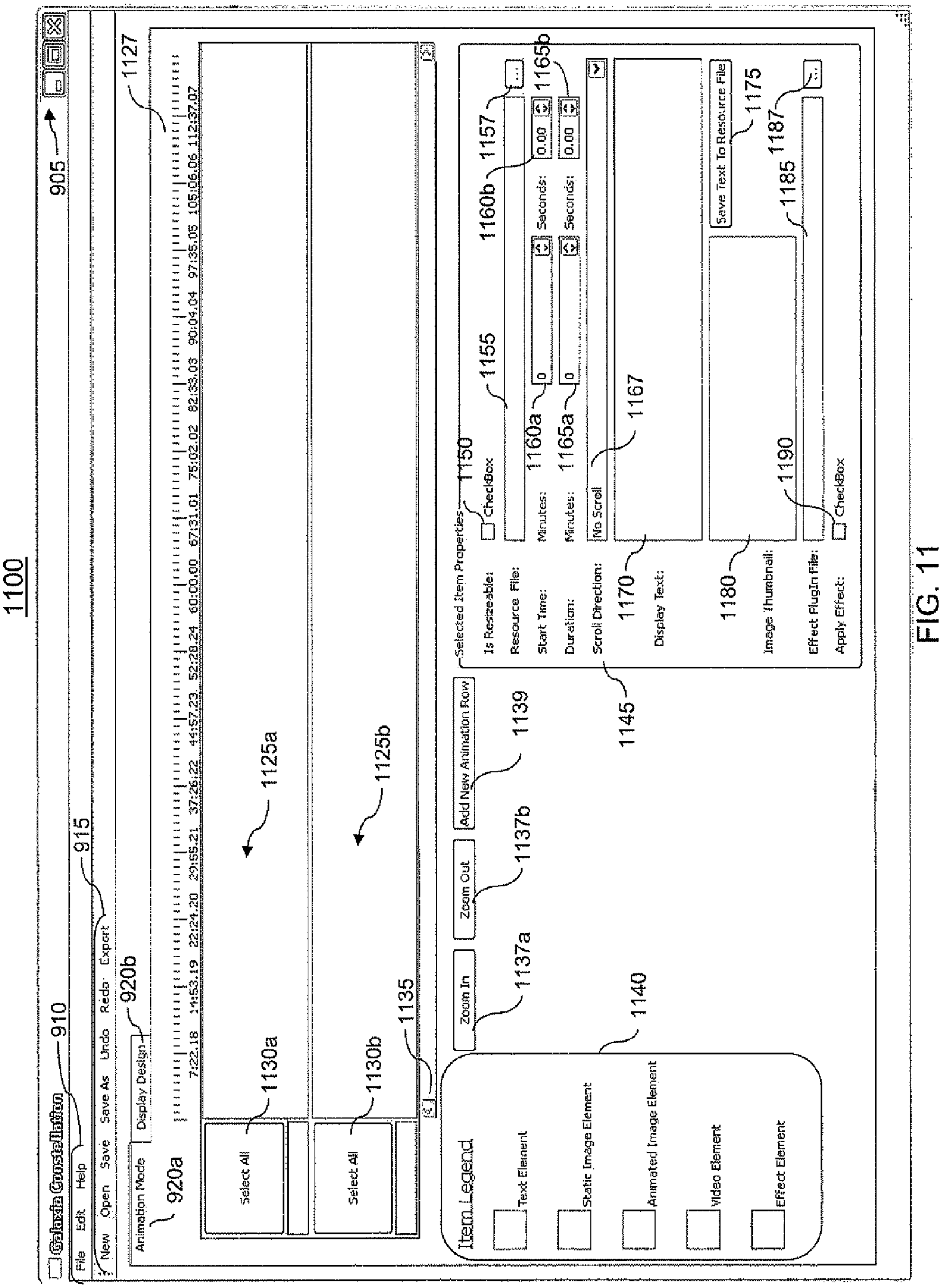
FIG. 11 illustrates a GUI.
Figure 12:
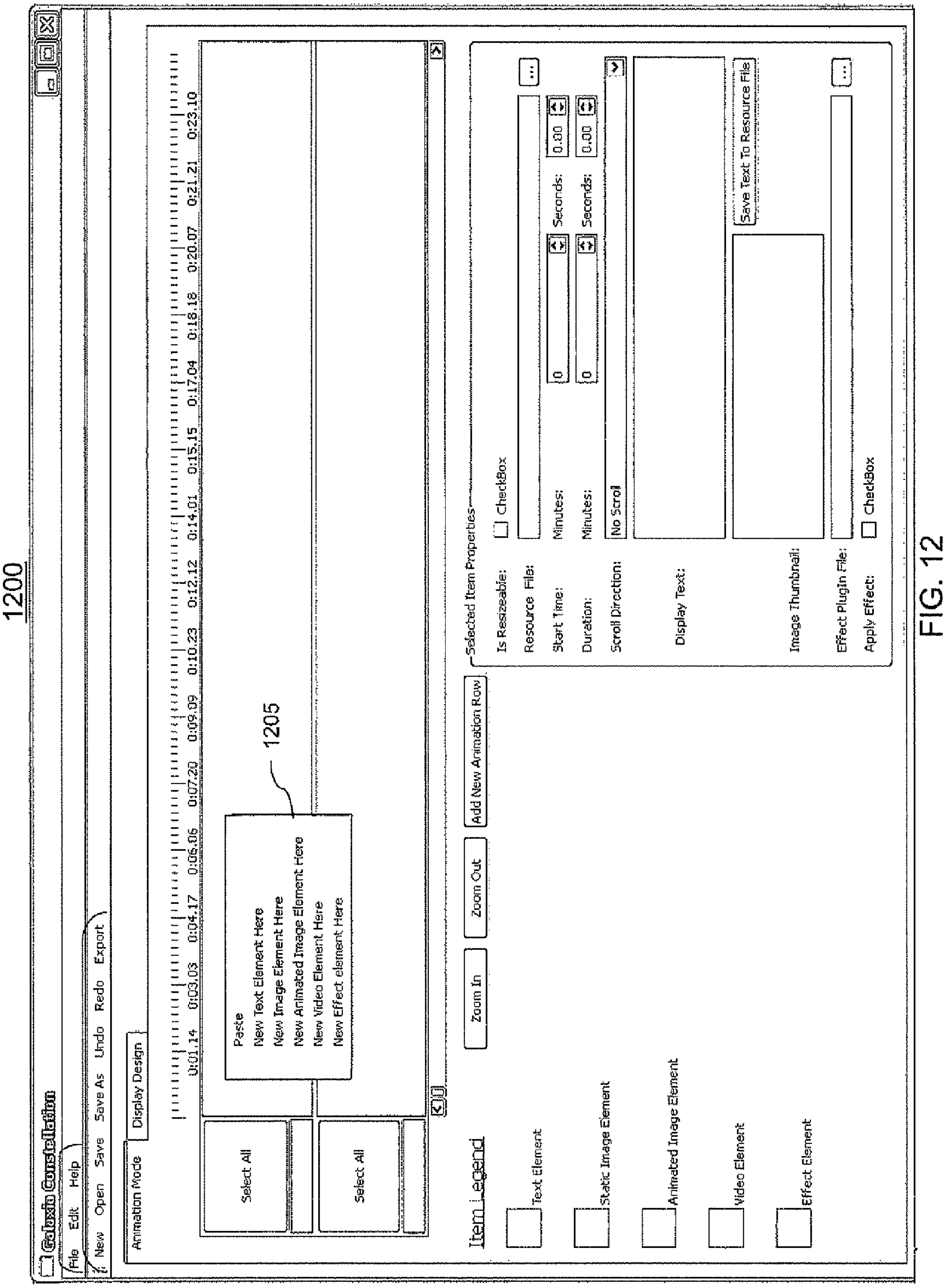
FIG. 12 illustrates a GUI.

The tabs 920 represent the selectable controls that may be used to navigate between the two main interfaces presented in the exemplary software embodiment illustrated by FIGS. 9-17. The tab 920*a* may be used to open the 'Animation Mode' interface as illustrated in FIG. 11. The tab 920*b* may be used to open the 'Display Design' interface as illustrated in FIG. 9. The 'Animation Mode' window may be utilized for the design and/or selection of a sequence of an image(s), animated image(s), text, video(s), or effect elements, or any individual such element. The 'Animation Mode' interface may be utilized independent of the existence of any display or light map. The 'Display Design' window may be utilized for an initial creation of a representative light image or map.

The display bar 925 may display a graphical, textual, or other representation of any images, animations, sequences, etc. designed in the 'Animation Mode' interface. The time scale bar 927 represents a relative time scale or duration for any sequence displayed in the display bar 925. The selection control 930 may be used to select any image, animation and/or sequence or other design element displayed in the display bar 925. The display bar control 935 may be used to scroll or navigate through the display bar 925 to display additional images, animations, sequences, etc. contained in the display bar 925, but not visible due to constraints of an available viewing area on a user system computer screen and/or limited by a programmed size of the GUI 900. The zoom controls 937 may contain a 'Zoom In' control 937*a* and a 'Zoom Out' control 937*b*. The zoom controls 937 may be used to display a larger or smaller time scale and/or time increments for ease of viewing animations, images or sequences displayed in the display bar 925. As illustrated in FIG. 9, the display bar 925 and selection control 930 may comprise a row, for example, a sector animation design row. A plurality of such rows may be included in GUI 900 that corresponds to the number of sectors or sector grids added to a light map. For example, numerous sector grids may be assigned and/or placed on the light map or rendered image loaded into the software program. While GUI 1500 illustrates an exemplary sector grid 1505, any number of sector grids may be assigned to a light map contained in the sector window 950 (FIG. 9). For example, if three sectors are assigned to a light map, three display bars 925 (FIG. 9) may be displayed in the GUI 900.

The video simulation control 940 may be used to generate a visual simulation output of the display that has been designed utilizing the software program. The export control 945 may be used to export the designed display to a file format that may be compatible with any number of multimedia programs. For example, selection of the export control 945 may result in the software program processing any display information contained in the display bar 925 for output as display sequence file that may be capable of being read by a lighting controller of the lighting system 105 (FIG. 1).

The sector window 950 may be used to display a light map or image created by the software program during the process 800 (FIG. 8). The sector window may display the relative positioning or location(s) of any lights associated with a lighting fixture apparatus, and/or allow selection of any portions or sectors of the displayed light map. The user controls 955 may be used to create, load, alter, save and/or make selections of a light map associated with the sector window 950. For example, the 'Create Light Map from Video' control 955*a* may allow a user to open and/or select a video file contained in any available memory storage device to be used in the creation of a light positioning image or light map by the software program as described in the process 800 (FIG. 8). The 'Save Light Map' control 955*b* may allow a user to save a light map displayed in the sector window 950 to any available memory storage device. The 'Load Light Map' control 955*c* may allow a user to load a light map created during a software program process 800, or any other available light map or position image, such as any light position image stored on an associated memory storage device, into the sector window 950. The control 955*c* may be used to load any light map that has been saved to a file extension associated with light positioning image(s) or light map(s). The 'Insert New Sector' control 955*d* may allow a user to select a portion or selection of a light map displayed in the sector window 950. If a user selects the 'Insert New Sector' control 955*d*, a sector grid, such as the sector grid 1505 of FIG. 15 may be displayed in the sector window 950 (FIG. 9). The 'Save Sector Layout' control 955*e* may allow a user to save any layout of a sector grid(s) displayed in the sector window 950. The 'Load Sector Layout' control 955*f* may allow a user to load any saved sector layout into the sector window 950.

The animation addition control 960 may allow a user to add an animation(s), image(s), and/or other design element(s) to a desired sector grid displayed in the sector window 950. A sector grid may be selected by utilizing the sector selection control 965. The sector selection control 965 may be embodied as a text box, drop-down menu, and or other control that may allow a user to select a sector grid that corresponds to a numerical value. For example, a first of a plurality of sector grids may be assigned the numerical value of '0'. Using this example, a user may add a design element to the sector grid '0' by selecting the number '0' in the sector selection control 965.

The animation property window 970 may display any data, information, parameters and/or properties associated with a desired sector as selected by the sector selection control 965. The animation property window 970 includes the animation selection text box 975, animation selection browse control 977, initiation time controls 980, and duration time controls 985. The animation selection text box 975 may allow a user to input a file name and/or other identifier associated with design element file or resource. For example, an image contained on any memory storage device, such as an image embodied as a GIF, PNG, or JPG may be input into the text box 975. Alternatively, the animation selection browse control 977 may allow a user to browse to any location on a memory storage device associated with a user system and/or select a design element to load into the software program. The initiation time controls 980 may allow a user to select and/or view a time that may be embodied as initiation time minutes 980*a* and/or initiation time seconds 980*b* that corresponds to an initiation or start time for a design element on the time scale bar 925. The duration time controls 985 may allow a user to select and/or view a time that may be embodied as duration time minutes 985*a* and/or duration time seconds 985*b* that corresponds to a duration of time for a design element on the time scale bar 925.

FIG. 10 illustrates an exemplary GUI 1000 that may allow a user to set light mapping or image rendering parameters as discussed according to process 800 of the software program. The GUI 1000 may be displayed to a user upon a selection of a control enabling the creation or generation of a light map, such as the control 'Create Light Map from Video' control 955*a* of GUI 900 (FIG. 9). The GUI 1000 may contain a pop-up window 1005, light mapping parameter controls 1010, lighting system parameter controls 1015 and parameter user controls 1020. The pop-up window 1005 may be alternatively displayed to a user as an integrated window of GUI 1000. The light mapping parameter controls 1010 may allow a user to define parameters to be utilized in the light mapping or image rendering operation(s) as discussed in the explanation of process 800 (FIG. 8). For example, a user may be allowed to select and/or define a pixel difference threshold value, a pixel intensity threshold, a pixel average multiplier and/or a video file seconds per step or any other parameters that may be used in creating a representative image or light map associated with a lighting fixture apparatus.

The lighting system parameter controls 1015 may include controls to input and/or select a number of lighting controllers or control boxes and/or number of lighting strands or other lighting fixture apparatus associated with the lighting system. The lighting system parameters may be utilized by the software program in calculating and/or determining a percentage or other representative value of lights detected or mapped versus a total value of lights associated with the lighting system. The parameter user controls 1020 may include any commonly known GUI controls such as a 'Reset to Defaults' control 1020*a*, an 'OK' control 1020*b*, and a 'Cancel' control 1020*c*. The 'Reset to Defaults' control 1020*a* may allow a user to return any parameter controls of the GUI 1005 to their default or system defined values. For example, the default parameter values may be originally set by the software program to be values that may be utilized positively in several different instances. The 'OK' control 1020*b* may allow a user to accept any parameters contained in the GUI 1005 and apply them to the light mapping operation of the process 800 (FIG. 8). Alternatively, the 'Cancel' control 1020*c* may allow a user to cancel any changes or modifications to the parameters of the GUI 1005 and/or close or exit out from the window.

FIG. 11 illustrates an exemplary GUI 1100 which may be presented to a user upon selection of the 'Animation Mode' tab 920*a*. The GUI 1100 includes window controls 905, main menu controls 910, submenu controls 915, tabs 920, animation bars 1125, animation time scale bar 1127, selection controls 1130, animation bar control 1135, zoom controls 1137, animation bar addition control 1139, design element legend 1140, and design element property window 1145.

The GUI 1100 may be displayed to a user for the design and/or selection of a display sequence. The animation bars 1125 may include any number of bars or rows in which a design element may be added. A plurality of animation bars 1125 may be included in GUI 1100 that corresponds to the number of individual animation designs that a user may be concurrently designing or selecting, limited, by for example, a user system's resources.

Design elements may be added to the animation bars 1125 by any available means. For example, by using a mouse, a user may 'right click' the area of an animation bar 1125 to be prompted to select a design element to add to the animation bar 1125. For example, GUI 1200 illustrates a pop-up window 1205 that may allow a user to select a design element from a given list or menu to be added to an animation bar 1125. If a selection on the window 1205 is made, a user may be prompted to input and/or browse to a memory storage location where a design element file(s) is located. A selected design element may be displayed in an animation bar 1125 according to its corresponding visual representation included in the design element legend 1140. For example, each design element such as a text element, an image element, an animation element, an effect element, etc. may be represented by a plurality of dissimilarly sized, shaped and/or colored boxes. For example, GUI 1400 illustrates a text design element representation 1435 and a static image element representation 1440 in an animation bar. A user may click on or select any design element representation displayed in the animation bars 1125 to display any properties associated with a design element in the design element property window 1145.

The animation time scale bar 1127 represents a relative time scale or duration for any design element displayed in the animation bar 1125. The selection controls 1130 may be used to select any image, animation, sequence or other design element displayed in the animation bars 1125. As illustrated in FIG. 11, the 'Select All' control **1130*a* may be used to select all design elements of the animation bar 1125*a* and the 'Select All' control 1130*b* may be used to select all design elements of the animation bar 1125*b*. A selection of all design elements contained in an animation bar may facilitate a user to save a design configuration of an entire animation or sequence display. The animation bar control 1135 may be used to scroll or navigate through the animation bars 1125 to display additional images, animations, sequences, etc. that may be contained in animation bar 1125, but not visible due to constraints of an available viewing area on a user system computer screen and/or limited by a programmed size of the GUI 1100. The zoom controls 1137 may contain a 'Zoom In' control 1137*a* and a 'Zoom Out' control 1137*b*. The zoom controls 1137 may be used to display a larger or smaller time scale and/or time increments for ease of viewing animations, images or other design elements displayed in the animation bars 1125**.

As illustrated in FIG. 11, the design element property window 1145 contains a resize checkbox 1150, a design element text box 1155, a design element selection browse control 1157, initiation time controls 1160, duration time controls 1165, scrolling direction control 1167, display text control 1170, save control 1175, image view 1180, effect text box 1185, effect selection browse control 1187 and effect checkbox 1190.

The resize checkbox 1150 may be selected by a user to allow the software to resize a design element to fit or correlate with any parameters associated with the representative light map contained in the sector window 950 (FIG. 9). For example, a parameter associated with a size of a defined sector or sector grid may have an effect on a size and/or shape of the design element that may be assigned and/or displayed in the sector. For example, the exemplary sector grid 1505 of GUI 1500 (FIG. 15) represents a small corner portion of the light map 1305 of GUI 1300 (FIG. 13). Alternatively, the exemplary sector grid 1605 of GUI 1600 (FIG. 16) represents a relatively larger portion of the light map 1305. Therefore, as sector grid may include any or all of a light map, various defined sectors may be limited in the size and/or shape of a design element that may be displayed. As illustrated in the GUI 1300, a light map, such as the light map 1305 may be larger than the sector window 950 (FIG. 9) such that the scrollable controls 1310 may be used to scroll or navigate through sector window 950 to display additional areas or portions of a representative light map that may be loaded, but not visible due to constraints of an available viewing area on a user system computer screen and/or limited by a programmed size of the GUI.

A design element text box 1155 may allow a user to view, input, and/or modify a file name and/or other identifier associated with design element file or resource. For example, GUI 1400 (FIG. 14) illustrates a text design element representation 1435 in the animation bar 1125 (FIG. 11). If a user selects to view any properties associated with the text design element 1435, the design element text box 1155 may be populated with the exemplary data 1405. For example, in GUI 1400, the file property data of the text design element 1435 includes the exemplary data 1405 as a file location with a file extension of '.txt'. Alternatively, a user may select a design element selection browse control 1157 (FIG. 11). The design element selection browse control 1157 may allow a user to browse to any location on a memory storage device associated with a user system and/or select a design element to load into the software program.

The initiation time controls 1160 may allow a user to select and/or view a time that may be embodied as initiation time minutes **1160*a* and/or initiation time seconds 1160*b* that corresponds to an initiation or start time for a selected design element on the animation time scale bar 1127. The duration time controls 1165 may allow a user to select and/or view a time that may be embodied as duration time minutes 1165*a* and/or duration time seconds 1165*b* that corresponds to a duration of time for a design element on the animation time scale bar 1127. For example, the exemplary initiation data 1415 and exemplary duration data 1420 of GUI 1400 (FIG. 14) illustrate that a selected design element, such as the text design element 1435, is to start its associated effect on the display sequence at '0.46 seconds' on the animation time scale bar 1127** and run or continue for a duration of '10.00 seconds'.

The scrolling direction control 1167 may allow a user to select or assign a spatial direction for creating the effect of 'scrolling text'. For example, the exemplary scrolling direction data 1425 of GUI 1400 (FIG. 14) illustrates that a selected design element, such as the text design element 1435, is not to scroll as the data illustrates the text 'No Scroll'. Alternatively, if a user enters the direction 'Right' in the scrolling direction control 1167 (FIG. 11), the selected design element may scroll from the left to right in the associated display sequence.

The display text control 1170 may allow a user to view and/or enter simple keyboard entry text. For example, the exemplary display text 1430 of GUI 1400 (FIG. 14) illustrates that a selected design element, such as the text design element 1435, displays the text 'Welcome to Galaxia'. Alternatively, if a user desires to enter simple text, by for example, bypassing a selection of a .txt or other text file, a user may be able of entering any desired text utilizing the display text control 1170. A save control 1175 may allow any user entered text displayed in the display text control 1170 to a resource file. For example, if a user desires to input and/or modify any text displayed in the display text control 1170, a text file, such as a resource file with a '.txt' file extension may be saved to a user system associated memory storage device.

The image view 1180 may display a thumbnail, icon and/or other visual representation of a selected design element. For example, in the GUI 1400 (FIG. 14), if a user selects to display the properties of the static image element representation 1440, and the static image design element represented by 1440 is a static image of a cat, then a thumbnail of a cat may be displayed in the image view 1180. The effect text box 1185 may allow a user to view, input, and/or modify a file name and/or other identifier associated an effect file or resource. For example, the software program may be populated with various non-positional effects such as any commonly known lighting effect, for example, a twinkling effect, a chasing effect and/or a fading effect, etc. The effect selection browse control 1187 may allow a user to browse to any location on a memory storage device associated with a user system and/or select any program or file associated with an effect to load into the software program. The effect checkbox 1190 may allow a user to select and/or deselect any application of an effect contained in the effect text box 1185 for execution during a display sequence.

If a user has completed the design process associated with the GUIs 9-16, a user may indicate completion by exporting a completed display sequence to a file format that may be compatible with the lighting system controller. For example, a user may select the export control 945 (FIG. 17) to initiate processing of a completed display sequence. As illustrated in GUI 1700, if a user initiates processing of a display sequence, a progress bar 1710 may be displayed. The progress bar 1710 may indicate the advancement or status of the system program in processing a display sequence. The progress bar 1710 may indicate completion of display sequence processing by, for example, displaying a full or completed progress bar. The file exported as a result of the display sequence processing may be any file type that is compatible with the lighting controller of the lighting system 105 (FIG. 1). For example, any proprietary and/or commonly known multimedia file extension may be used that is able to be read and/or processed by the lighting controller to display a display sequence utilizing any lights associated with the lighting fixture apparatus.

What is claimed is:

1. A method of controlling a plurality of lighting elements, comprising:

assigning an address to a lighting element;

capturing an image of the lighting element during simultaneous emission of light by at least two of the lighting elements;

detecting a spatial location of the lighting element assigned to the address based on the image information;

determining the spatial location of the lighting element based on a pattern of addresses which causes the lighting element to emit light and a sequence of images including the image of the lighting element; and selectively controlling the lighting elements based on a display request.

2. The method according to claim 1, wherein the display request is from a user.

3. The method according to claim 1, wherein the detecting includes determining whether the pattern illuminates a sensor included in the lighting element.

4. The method according to claim 3, comprising:

mapping graphic to a subset of the lighting elements; and displaying the graphic by controlling the subset in accordance with the display request.

5. The method according to claim 3, comprising:

capturing images of the lighting elements continuously; and, converting the images to a format that is enabled to be manipulated on a singular frame level.

6. The method according to claim 5, wherein the capturing obtains the sequence of images on a time base which is uncorrelated to a device controlling the pattern.

7. The method according to claim 5, wherein the capturing obtains the sequence of images synchronized to the pattern from a pre-determined direction.

8. The method according to claim 1, comprising:

synchronizing a timing of control of the lighting element with a data acquisition rate of a device acquiring the image.

9. The method according to claim 8, wherein the display request identifies the device.

10. The method according to claim 1, comprising:

analyzing a set of images and determining the illumination response of the lighting element based on the set.

11. The method according to claim 1, wherein information of the locations of the lighting elements is displayed to a user via a graphical user interface wherein the user may correct the spatial location detected for the lighting element.

12. The method according to claim 2, comprising:

outputting a graphical representation of an expected display resulting from the controlling of the lighting elements based on the display request.

13. The method according to claim 1, wherein the lighting elements are controlled based on groups of addresses assigned based on a physical interface of the lighting elements.

14. The method according to claim 1, wherein the detecting includes manipulating emission of light of by the visual elements based on a temporal and topologic sequence of addresses.

15. The method according to claim 14, wherein the sequence is based on a parallel calibration algorithm which minimizes a number of image frames required to determine the location.

16. The method according to claim 6, wherein the lighting elements are detected based on application of one of a pixel difference threshold value, a pixel intensity threshold, and a pixel average multiplier, to a set in the sequence of images to obtain temporal synchronization to the pattern and a representative pattern locating the visual elements is created based on the synchronization.

17. The method according to claim 1, wherein the lighting elements include light emitting semiconductor devices.

18. The method according to claim 17, wherein the lighting element includes a liquid crystal device and a light emitting device.

19. A system for controlling lighting elements, comprising:

a user system transmitting a display request; and a controller controlling the lighting elements based on the display request, a table correlating an address assigned to a lighting element to a detected spatial location of the lighting element, and a modulation function assigned to the lighting element and determining the location and the modulation function based on analysis of a sequence of images of simultaneous emission of light by two or more of the lighting elements and determining the spatial location of the lighting element based on a pattern of addresses which causes the lighting element to emit light and a sequence of images including an image of the lighting element.

20. The system according to claim 19, wherein the system comprises a composite of lighting elements including lighting elements comprising a liquid crystal device and a light emitting device.

21. The system according to claim 20, wherein the lighting elements comprising the display unit include a lighting element comprising LEDs including infrared or ultraviolet LEDs and a light sensor.

22. The lighting system according to claim 19, wherein the display request is a sequence of images from a live source.

23. The lighting system according to claim 19, comprising:

synchronizing a timing of the emission of light by the visual elements with a device acquiring the sequence of images information, and the device is indicated by the controller.

24. A non-transitory computer readable storage medium having stored therein a program to cause a computer to execute an operation comprising:

detecting a spatial location and a brightness function associated with an address of a variably distributed lighting elements;

determining the spatial location of the lighting element based on a pattern of addresses which causes the lighting element to emit light and a sequence of images including the image of the lighting element during simultaneous emission of light by lighting elements in a pattern including two or more lighting elements;

the lighting element including a light emitter and a liquid crystal device; and selectively controlling the lighting element based on a display request.

25. The non-transitory computer readable medium according to claim 24, the operation comprising:

identifying positions of the lighting elements based on a predetermined addressing and modulation sequence as part of the detecting;

mapping a pattern to the positions of the lighting elements based on an editable element position map presented to a user; and displaying an image based on the pattern by controlling the lighting elements in accordance with the display request.

26. An apparatus for controlling lighting elements comprising:

a controller powered by an AC or DC power source, determining an address, a spatial location and an illumination control function associated with a lighting element based on an image of the lighting element during simultaneous emission of light by at least two of the lighting elements and detecting the spatial location of the lighting element assigned to the address based on the image information and determining the spatial location of the lighting element based on a sequence of images including the image of the lighting element, which sequence of images are acquired while a calibration sequence which comprises a pattern of address which causes the lighting element to emit light is executed, executing the calibration sequence which simultaneously emit light from a plurality of lighting elements for a time interval based on a clock rate;

a fixture comprising:

a plurality of lighting elements enabled to be controlled by the controller and located at varying locations determined by a user; and an image acquisition device obtaining the images of the visual element based on a frequency uncorrelated to the clock rate.

* * * * *